United States Patent
Nakashima et al.

(10) Patent No.: US 9,024,585 B2
(45) Date of Patent: May 5, 2015

(54) BATTERY PARALLEL-OPERATION CIRCUIT AND BATTERY SYSTEM

(75) Inventors: Takeshi Nakashima, Kobe (JP); Takehito Ike, Kobe (JP); Ryuzo Hagihara, Kobe (JP); Chie Sugigaki, Kobe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 510 days.

(21) Appl. No.: 13/416,970

(22) Filed: Mar. 9, 2012

(65) Prior Publication Data

US 2012/0212062 A1 Aug. 23, 2012

Related U.S. Application Data

(63) Continuation of application No. PCT/JP2011/004480, filed on Aug. 6, 2011.

(30) Foreign Application Priority Data

Aug. 6, 2010 (JP) .................................. 2010-177254
Oct. 8, 2010 (JP) .................................. 2010-228088

(51) Int. Cl.
*H02J 7/00* (2006.01)
*H02J 7/02* (2006.01)
*H02J 7/35* (2006.01)

(52) U.S. Cl.
CPC ............. *H02J 7/0019* (2013.01); *H02J 7/0026* (2013.01); *H02J 7/022* (2013.01); *H02J 7/35* (2013.01); *Y02T 10/7055* (2013.01)

(58) Field of Classification Search
CPC ........................................................ H02J 7/0024
USPC ............................................................ 320/117
See application file for complete search history.

(56) References Cited

U.S. PATENT DOCUMENTS

| | | | |
|---|---|---|---|
| 5,739,596 A | 4/1998 | Takizawa et al. | |
| 6,377,028 B1 * | 4/2002 | Armstrong et al. | 320/136 |
| 7,002,265 B2 * | 2/2006 | Potega | 307/149 |
| 2001/0000423 A1 * | 4/2001 | Fischer et al. | 320/114 |
| 2005/0068005 A1 * | 3/2005 | Yamashita | 320/116 |
| 2009/0197152 A1 * | 8/2009 | Johnson et al. | 429/61 |
| 2010/0060232 A1 * | 3/2010 | Boyles et al. | 320/107 |

FOREIGN PATENT DOCUMENTS

| | | |
|---|---|---|
| JP | 5-130743 A | 5/1993 |
| JP | 8-336241 A | 12/1996 |
| JP | 2002-142353 A | 5/2002 |
| JP | 2003-235178 A | 8/2003 |
| JP | 2010-130717 A | 6/2010 |

* cited by examiner

*Primary Examiner* — Yalkew Fantu
(74) *Attorney, Agent, or Firm* — Marvin A. Motsenbocker; Mots Law, PLLC

(57) ABSTRACT

A first line includes a switching element and is electrically coupled to a branch point and an external load which is electrically connectable to a battery parallel-operation circuit. A second line includes a resistive element, and is electrically coupled to the external load and the branch point. The first line and the second line are each provided in a plurality. The plural first lines are connected in parallel to one another, and the plural second lines are connected in parallel to one another. The branch points are electrically coupled respectively to plural external, connectable battery units.

20 Claims, 16 Drawing Sheets

FIG. 14

| APPLIED VOLTAGE [V] | CURRENT [A] | TEMPERATURE [°C] | RESISTANCE [Ω] | HEATING VALUE [W] |
|---|---|---|---|---|
| 26 | 0.11 | 135.5 | 236.4 | 2.86 |
| 24 | 0.12 | 134.8 | 200.0 | 2.88 |
| 22 | 0.13 | 134.2 | 169.2 | 2.86 |
| 20 | 0.15 | 133.3 | 133.3 | 3 |
| 18 | 0.16 | 132.6 | 112.5 | 2.88 |
| 16 | 0.18 | 131.8 | 88.9 | 2.88 |
| 14 | 0.2 | 130.7 | 70.0 | 2.8 |
| 12 | 0.24 | 129.7 | 50.0 | 2.88 |
| 10 | 0.28 | 128.3 | 35.7 | 2.8 |
| 8 | 0.34 | 126.2 | 23.5 | 2.72 |
| 6 | 0.42 | 121.2 | 14.3 | 2.52 |
| 4 | 0.52 | 104.6 | 7.7 | 2.08 |
| 0 | 0 | - | 6.0 | 0 |

BATTERY PARALLEL-OPERATION CIRCUIT AND BATTERY SYSTEM

CROSS REFERENCE TO RELATED APPLICATIONS

This application is a continuation application of International Application No. PCT/JP2011/004480, filed on Aug. 6, 2011, entitled "BATTERY PARALLEL-OPERATION CIRCUIT AND BATTERY SYSTEM", which claims priority based on Article 8 of Patent Cooperation Treaty from prior Japanese Patent Applications No. 2010-177254, filed on Aug. 6, 2010, entitled "BATTERY PARALLEL-OPERATION CIRCUIT AND BATTERY SYSTEM", and No. 2010-228088, filed on Oct. 8, 2010, entitled "BATTERY PARALLEL-OPERATION CIRCUIT AND BATTERY SYSTEM", the entire contents of which are incorporated herein by reference.

BACKGROUND OF THE INVENTION

1. Field of the Invention

The invention relates to a battery parallel-operation circuit used to connect plural battery units in parallel to one another. The invention also relates to a battery system using a battery parallel-operation circuit.

2. Description of Related Art

JP2002-142353A discloses a system using parallel-connected plural battery units each of which includes one or more secondary batteries. FIG. 12 shows apparatus 900 using plural battery units connected in parallel to one another. In apparatus 900, battery units 901 to 903 are connected in parallel to one another. The output of battery units 901 to 903 drive load 910 in apparatus 900. Battery units 901 to 903 are charged by charging circuit 911 in apparatus 900.

The characteristics of the secondary batteries deteriorate with repeated charging and discharging. For this reason, in many cases, apparatus 900 using battery units 901 to 903 is configured so that each battery unit can be replaced. For instance, the user of apparatus 900 can change only battery unit 901 when necessary.

SUMMARY OF THE INVENTION

If battery units are not replaced at all, the battery units are substantially uniform in terms of their characteristics because all the battery units are charged and discharged equally. In contrast, if only battery unit 901 is removed from apparatus 900 and a new battery unit is attached in place of battery unit 901, the characteristics of the battery units in apparatus 900 may be non-uniform. For instance, a battery unit to be newly provided as battery unit 901 may possibly have a significantly greater open circuit voltage than battery units 902 and 903 that are not replaced with new ones. In this case, replacement of battery unit 901 with the new one may cause a relatively large current to flow from new battery unit 901 to battery units 902 and 903.

If battery units 901 to 903 are formed by using secondary batteries with relatively large internal resistances (e.g., lead-acid batteries), a large current that may deteriorate or damage the battery units is unlikely to flow even after the above-described battery-unit replacement. In contrast, if the battery units are formed by using secondary batteries with relatively small internal resistances (e.g., lithium-ion batteries and nickel-metal-hydride batteries), which are now studied actively, a large current is more likely to flow between the battery units and to deteriorate or damage the battery units after the above-described battery-unit replacement.

An aspect of the invention provides a battery parallel-operation circuit that comprises: a first line electrically coupled to a branch point and an external load that is electrically connectable to the battery parallel-operation circuit, the first line comprising a switching element; and a second line electrically coupled to the external load and the branch point, the second line comprising a resistive element; wherein the battery parallel-operation circuit includes a plurality of the first lines and a plurality of the second lines, the plurality of first lines are electrically coupled in parallel to one another, and the plurality of second lines are electrically coupled in parallel to one another, and wherein a plurality of the branch points are electrically coupled respectively to plurality of external, connectable battery units.

Another aspect of the invention provides a battery system that comprises: plurality of battery units; a battery parallel-operation circuit that comprises: a first line electrically coupled to a branch point and an external load that is electrically connectable to the battery parallel-operation circuit, the first line comprising a switching element; and a second line electrically coupled to the external load and the branch point, the second line comprising a resistive element; wherein the battery parallel-operation circuit includes a plurality of the first lines and a plurality of the second lines, the plurality of first lines are connected in parallel to one another, and the plurality of second lines are connected in parallel to one another, and wherein the branch points are electrically coupled respectively to the plurality of battery units.

BRIEF DESCRIPTION OF THE DRAWINGS

FIG. 14 is a table related to the eighth example and showing characteristics of a PTC thermistor used in the simulation.

DETAILED DESCRIPTION OF EMBODIMENTS

Figure 1:
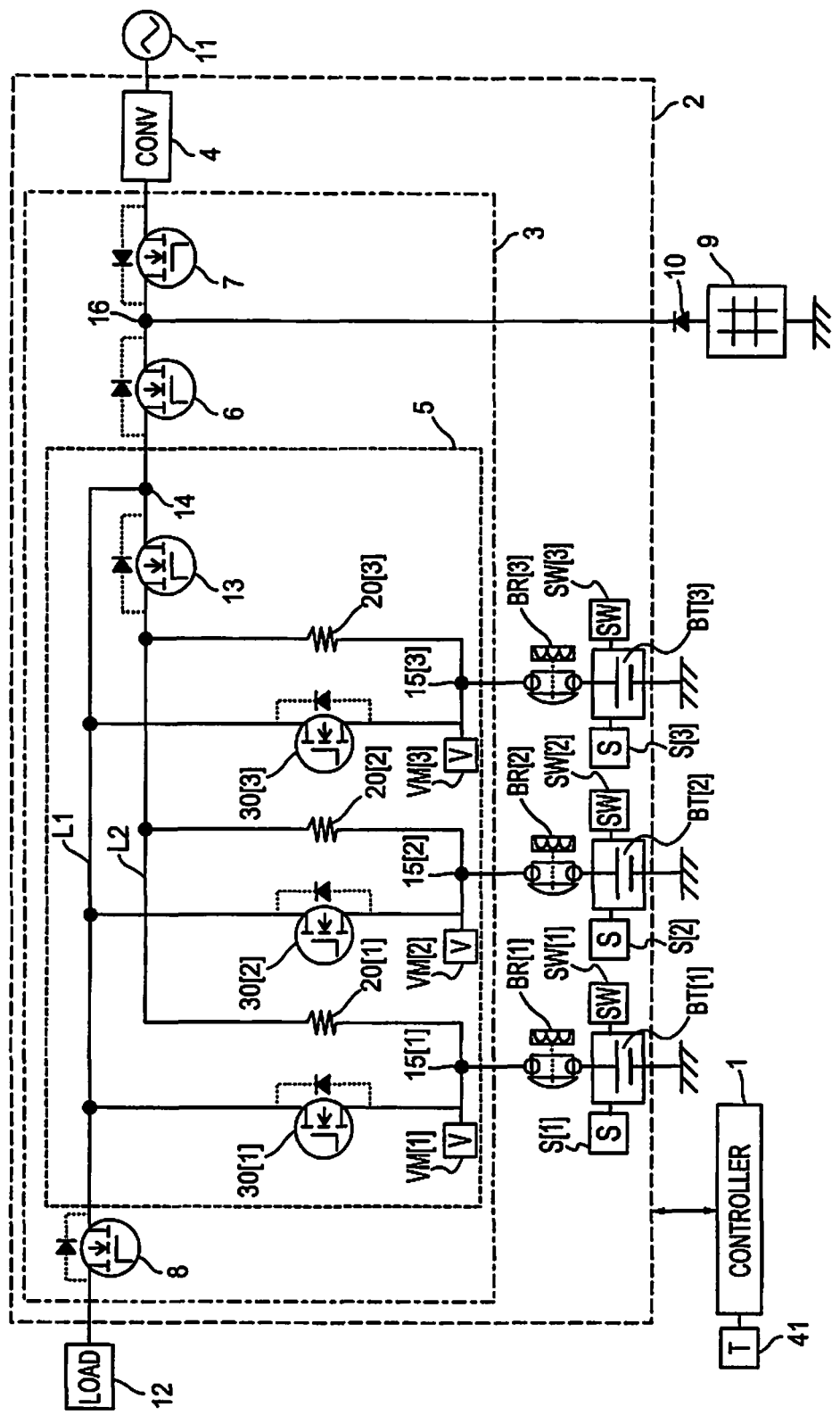
FIG. 1 is a schematic, overall circuit diagram illustrating a battery system according to an embodiment.

Embodiments of the invention are described by referring to the drawings. The same portions that appear in various drawings are denoted by the same reference numerals, and no redundant description of such portions is provided. The terms "wire" and "line" used in this specification refer to conductors with small enough resistances. Thus, the resistances of the wires and the lines are ignored. In contrast, the term "resistive element" refers to an element with significant resistance placed on a conductor. Before describing first to an eighth examples, description is provided for those things that are common to all the examples or that are referred to in the description of the examples.

FIG. 1 shows a schematic, overall circuit diagram of a battery system of an embodiment. Controller 1 including an arithmetic processing unit and the like monitors the state of controlled unit 2, and controls the operations of various portions of controlled unit 2. Controlled unit 2 includes switch unit 3, power converter circuit 4, plural battery units, and plural breakers corresponding respectively to plural battery units. Switch unit 3 includes parallel-connected circuit 5 and switching elements 6 to 8. Controlled unit 2 is electrically coupled to solar cell 9, diode 10, power-supply circuit (source of AC voltage in this embodiment) 11, and load 12. Those diodes used in this embodiment are, for instance, PN-junction-type diodes, but diodes of other types may be used instead.

The plural battery units provided in controlled unit 2 are electrically coupled to parallel-connected circuit 5 via plural breakers respectively. The plural battery units are electrically coupled in parallel to one another via parallel-connected circuit 5. Two or more battery units are to be electrically coupled in parallel to one another via parallel-connected circuit 5. That is, two, three, four, five, six, or more battery units are to be connected in that way. In this embodiment, three battery units are connected in that way unless mentioned otherwise, and the three battery units are denoted by reference numerals BT[1] to BT[3]. The breaker corresponding to battery unit BT[i] is denoted by reference numeral BR[i]. The letter i in those reference numerals represents an integer.

Figures 2A, 2B, 2C:
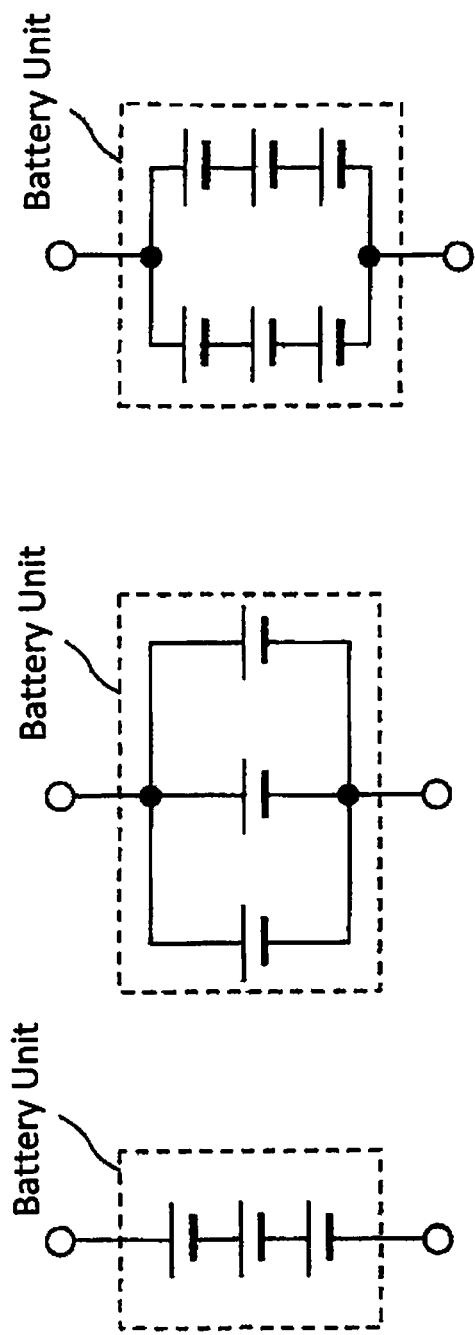
FIG. 2 is a diagram illustrating various examples of the internal configuration of a single battery unit.

All the battery units BT[1] to BT[3] used in this embodiment may have identical structures, so the description of only battery unit BT[1] is provided as a representative example. Battery unit BT[1] includes one or more secondary batteries each of which may have a quite small internal resistance. If battery unit BT[1] includes plural secondary batteries, the plural secondary batteries may form any of the following circuits: a series-connected circuit of the second batteries such as one shown in FIG. 2A; a parallel-connected circuit of the second batteries such as one shown in FIG. 2B; and a combination circuit including both series-connected and parallel-connected circuits such as one shown in FIG. 2C. The secondary batteries may include rechargeable batteries. Lithium-ion batteries and nickel-metal-hydride batteries are examples of the secondary batteries having a quite small internal resistance. Battery unit BT[1] has a negative output terminal and a positive output terminal, and outputs a positive voltage from the positive output terminal with the potential of the negative output terminal used as a reference. Voltage mentioned in this embodiment is a voltage based on the potential at a reference potential point. In the drawings of this embodiment, each battery unit is schematically shown as a single battery. However, each battery unit may include series-connected plural batteries, parallel-connected plural batteries, or a combination of both.

The positive output terminal of battery unit BT[i] is electrically coupled to branch point 15[i] via breaker BR[i]. Branch point 15[i] is electrically coupled to main line L1 via switching element 30[i] (i is 1, 2, or 3 in this embodiment). One switching element 30[i] is provided for each battery unit, and is coupled in series between the corresponding battery unit and main line L1. Branch point 15[i] is electrically coupled to sub-line L2 via resistive element 20[i] (i is i, 2, or 3 in this embodiment). One resistive element 20[i] is provided for each battery unit, and is connected in series between the corresponding battery unit and sub-line L2. Hence, battery units BT[1] to BT[3] are electrically coupled in parallel to one another via main line L1, and are electrically coupled in parallel to one another via sub-line L2 as well. Note that resistive elements 20[1] to 20[3] used in this embodiment are identical to one another and switching elements 30[1] to 30[3] are identical to one another.

Main line L1 is a principal wire for charging current flow to battery unit BT[i], and is also a principal wire for discharging current flow from battery unit BT[i]. Sub line L2 is an auxiliary wire for charging current flow to battery unit BT[i], and is also an auxiliary wire for discharging current flow from battery unit BT[i]. Note that the charging of battery unit BT[i] means the charging of the secondary batteries included in battery unit BT[i]. Likewise, the discharging of battery unit BT[i] means the discharging of the secondary batteries included in battery unit BT[i].

Main line L1 is electrically coupled to the output terminal of power converter circuit 4 via switching elements 6 and 7, and is also electrically coupled to the cathode of diode 10 via switching element 6. In addition, main line L1 is electrically coupled to load 12 via switching element 8 as well. Sub-line L2 is electrically coupled to main line L1 via switching element 13. Any semiconductor switches or mechanical switches may be used as the switching elements in the battery system. In this embodiment, n-channel-type metal-oxide-semiconductor field-effect transistors (MOSFETs)-a kind of field-effect transistor-are used as the switching elements in the battery system. Note that in the description of this embodiment, n-channel-type MOSFETs used as the switching elements in the battery system are denoted as FETs.

The state of electrical continuity in each FET of switching unit 3 is controlled by controller 1. As is well known, the state where an FET is on corresponds to the state where the drain and the source of the FET are electrically continuous. In contrast, the state where an FET is off corresponds to the state where the drain and the source of the FET are electrically discontinuous. A parasitic diode is provided for each FET. This can be interpreted as either that each FET has a built-in parasitic diode, or that the parasitic diode is a circuit element electrically coupled in parallel to the FET. In each FET, the parasitic diode is electrically coupled in parallel to the FET with the direction from the source to the drain of the FET being the forward direction.

Figure 10A:
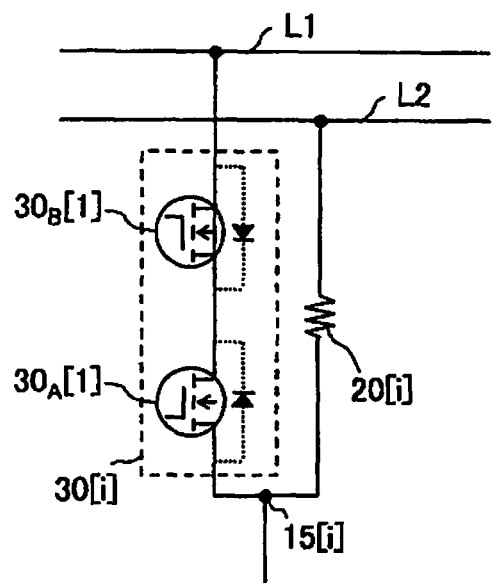
FIG. 10 is a diagram related to a fourth example and illustrating the configurations of switching elements each of which includes a circuit with two FETs connected in series to each other.
Figure 10B:
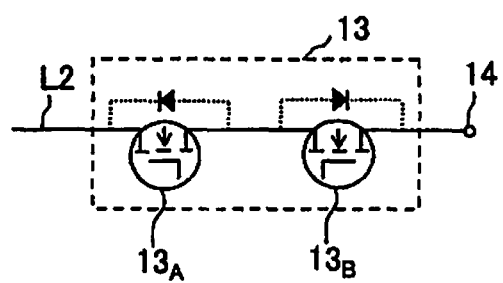

Each switching element may be formed as a series-connected circuit of two FETs (see FIGS. 10A and 10B). In this embodiment, however, each switching element is assumed to be formed, in principle, with a single FET (an exception to this principle is described in the fourth example). Accordingly, if, for instance, switching element 30[i] is formed with a single FET, switching element 30[i] is denoted as FET 30[i].

The sources of FETs 30[1] to 30[3] are electrically coupled to branch points 15[1] to 15[3], respectively. The drains of FETs 30[1] to 30[3] are electrically coupled to main line L1. The drains of FETs 30[1] to 30[3] and the drains of FETs 8 and 13 are commonly coupled at a point on main line L1, and the common-connection point is referred to as connection point 14. The source of FET 13 is electrically coupled to sub-line L2, and the source of FET 8 is electrically coupled to load 12. Connection point 14 is electrically coupled to the source of FET 6. The drains of FETs 6 and 7 are electrically coupled to each other at connection point 16. The source of FET 7 is electrically coupled to the output terminal of power converter circuit 4. FET 7 is provided to prevent electric current from flowing backward from the side of connection point 16 to the side of power converter circuit 4. Without FET 7, an overcurrent caused by the output of solar cell 9 is sometimes applied to power converter circuit 4, and damages power converter circuit 4. Provision of FET 7 can prevent such overcurrent applied to power converter circuit 4 from damaging power converter circuit 4. In addition, provision of FET 7 is expected to have the effect of reducing power consumption in power converter circuit 4. Connection point 16 is electrically coupled to the cathode of diode 10, and the anode of diode 10 is electrically coupled to the output terminal of solar cell 9.

Under the control of controller 1, power converter circuit 4 converts the AC electric power supplied by AC voltage source 11 to DC electric power. Power converter circuit 4 outputs the DC voltage and DC current thus obtained out through its output terminal. Solar cell 9 converts light such as sunlight to DC electric power, and outputs the DC voltage and DC current thus obtained out through its output terminal.

If battery unit BT[i] needs charging, controller 1 turns on both FETs 6 and 7. Thus, either the output current of solar cell 9 or the output current of power converter circuit 4 is supplied to the side of connection point 14 as the charging current for battery unit BT[i]. Alternatively, controller 1 may turn on only FET 6 of the above-mentioned two FETs 6 and 7, and thus supplies the output current of solar cell 9 to the side of connection point 14 as the charging current for battery unit BT[i]. The charging current supplied to the side of connection point 14 is supplied to battery unit BT[i] either through main line L1 or through sub-line L2. The following description assumes that if battery unit BT[i] needs charging, both FETs 6 and 7 are turned on unless mentioned otherwise. It is, however, not essential to turn FET 7 on. Similar actions to those caused by turning on only FET 6 of two FETs 6 and 7 can be caused by turning on both FETs 6 and 7. The turning on of only FET 6, however, increases power consumption. Accordingly, if battery unit BT[i] needs charging, it is desirable to turn on both of FETs 6 and 7. Both the open circuit voltage of solar cell 9 and that of power converter circuit 4 are assumed to be larger than the output voltages of battery units BT[1] to BT[3]. For the sake of descriptive simplicity, the internal resistance of each of battery units BT[1] to BT[3] is assumed to be zero unless it is necessary to assume otherwise. If controller 1 judges that the charging of battery unit BT[i] is not necessary, or if controller 1 judges that it is necessary to prohibit the charging of battery unit BT[i], controller 1 turns off FETs 6 and 7. For instance, if battery unit BT[i] is in an abnormal state (including the event of overcurrent), the charging of battery unit BT[i] is prohibited.

Solar cell 9 forms a first electric-power source whereas both source of AC voltage 11 and power converter circuit 4 together form a second electric-power source. Nevertheless, any of the two electric-power sources may be omitted.

If battery unit BT[i] needs discharging, or, to put it differently, if it is necessary to supply electric power to load 12, controller 1 turns on FET 8. Thus the discharging current of battery unit BT[i] is supplied to load 12 either through main line L1 or through sub-line L2. If controller 1 judges that the discharging of battery unit BT[i] is not necessary, or if controller 1 judges that it is necessary to prohibit the discharging of battery unit BT[i], controller 1 turns off FET 8. For instance, if battery unit BT[i] is in an abnormal state (including the event of overcurrent), or if an excessively large current passes through FET 8, the discharging of battery unit BT[i] is prohibited.

Controller 1 is capable of controlling the continuity of each of FETs 6 to 8 in accordance with the output voltages of battery units BT[1] to BT[3]. Controller 1 is capable of detecting the output voltage of battery unit BT[i] either periodically or at any timing by use of, for instance, voltage-detection sensors S[i].

Voltage-detection sensors S[1] to S[3] output output-voltage information of battery units BT[1] to BT[3]. The output-voltage information mentioned above includes not only the information on the output voltages but also the broader information that can be used to specify the output voltages. Controller 1 receives the output-voltage information. Controller 1 may receive the output-voltage information directly from voltage-detection sensors S[1] to S[3]. Alternatively, a third apparatus may be provided to receive the output-voltage information of battery units BT[1] to BT[3]. Then, the third apparatus processes the data, and then sends the processed data to controller 1.

In the following description, for the sake of descriptive convenience, FETs 6 and 7 are also referred to as charger FETs 6 and 7 whereas FET 8 is also referred to as discharger FET 8. In addition, FET 13 is also referred to as sub-line FET. There are cases where the output voltage of battery unit BT[i] differs from that of BT[j] (both i and j are integers, and i not=j). Even in such cases, no current that would cause depreciation of battery units BT[i] and BT[j] is allowed to flow between battery units BT[i] and BT[j]. To this end, the resistances of resistive elements 20[i] and 20[j] are determined appropriately. In the following description, for the sake of descriptive simplicity, the values of on-resistances of FETs 30[1] to 30[3] are assumed to be zero, and the resistances of resistive elements 20[1] to 20[3] are assumed to be the same.

Breaker BR[i] is a mechanical relay or the like that is connected in series between battery unit BT[i] and branch point 15[i]. Breaker BR[i] is capable of cutting the electrical connection between battery units BT[i] and branch point 15[i] when necessary. For instance, breaker BR[i] cuts the electrical connection between battery unit BT[i] and branch point 15[i] if either the charging current or the discharging current for battery unit BT[i] is abnormally large, or if any abnormal signal is sent from battery unit BT[i], or if a predetermined signal to cut the connection is sent from controller 1.

Figure 3:
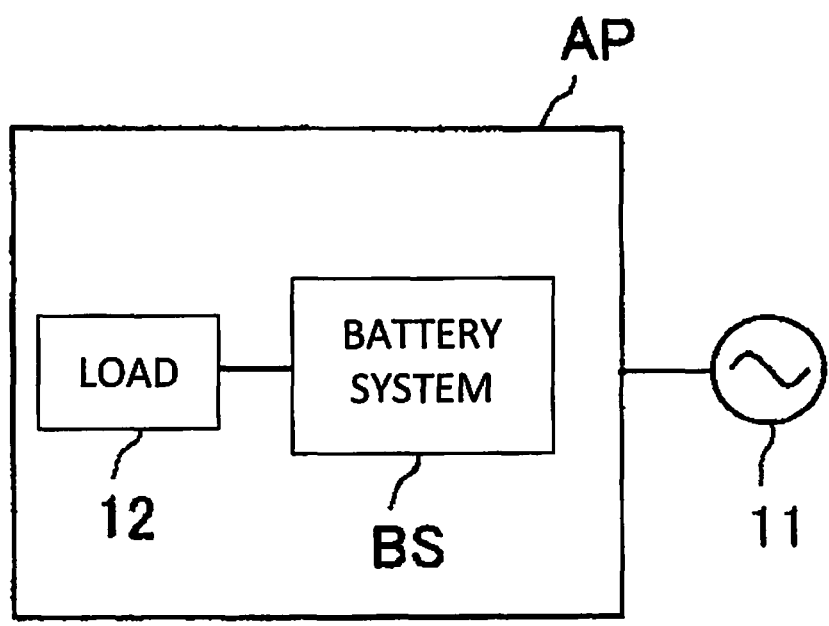
FIG. 3 is a schematic diagram illustrating the configuration of an apparatus using the battery system.

Both controller 1 and controlled unit 2 may be considered as constituent elements of the battery system shown in FIG. 1. As FIG. 3 shows, battery system BS as the battery system shown in FIG. 1 may be built into apparatus AP that includes load 12. Apparatus AP is any apparatus driven by the output power of the secondary batteries in the battery system BS. Some examples of apparatus AP are electrically-driven vehicles, power tools, PCs, mobile phones, and PDAs.

Battery units BT[1] to BT[3] are attachable to or detachable from apparatus AP independently of each other. Each battery unit can be changed from to a new one. To put it differently, the user of apparatus AP can remove, from apparatus AP, battery unit BT[1] that is currently set in apparatus AP, and attach another battery unit in apparatus AP as a new battery unit BT[1] (battery units BT[2] and BT[3] can be treated similarly). Once battery unit BT[1] is removed from apparatus AP, the electrical connection between battery unit BT[1] and battery system BS is cut off completely. If, however, another battery unit is attached to apparatus AP as a new battery unit BT[1], electrical connection is formed between the new battery unit BT[1] and battery system BS (the same happens in the cases of battery units BT[2] and BT[3]. The series of operations to remove battery unit BT[i] from apparatus AP and attach a new battery unit in apparatus AP as a new battery unit BT[i] is referred to as battery-unit replacement.

If no battery-unit replacement occurs, battery units BT[1] to BT[3] are charged and discharged uniformly, so that the output voltages of battery units BT[1] to BT[3] are spontaneously equalized through the processes of charging and discharging. Conversely, if battery-unit replacement occurs, the output voltages of battery units BT[1] to BT[3] sometimes become different from one another. For instance, after battery-unit replacement, the output voltages of battery units BT[1] to BT[3] may be 55 V, 50 V, and 50 V respectively. Note that the expressions 55 V and 50 V mean 55 volts and 50 volts respectively (the same applies to 49 V and the like described later). In this case, if the positive output terminals of battery units BT[1] to BT[3] are directly connected to one another, an excessively large current flows from battery unit BT[1] to both battery units BT[2] and BT[3], and the large current may cause depreciation or damage of the battery units.

Specific examples of the configuration and the system based on the above-described configuration are described below as first to eighth examples.

Example 1

A first example is described. In the first example, voltage-detection sensors S[1] to S[3] detect the output voltages of battery units BT[1] to BT[3], and on the basis of the detection result, controller 1 controls the states of electrical continuity of FETs 30[1] to 30[3].

Detailed description is provided for the controlling method performed by controller 1. In the following description, V[i] means the output voltage of battery unit BT[i] detected by voltage-detection sensor S[i]. Voltage-detection sensors S[1] to S[3] detect output voltages V[1] to V[3]. Here, detection errors are ignored. Controller 1 identifies the maximum voltage V and the minimum voltage $V_{MIN}$ of the output voltages V[1] to V[3], and calculates the voltage difference ($V_{MAX}-V_{MIN}$). The voltage difference ($V_{MAX}-V_{MIN}$) is an indicator of the variation in the output voltage among battery units BT[1] to BT[3]. Controller 1 compares the voltage difference ($V_{MAX}-V_{MIN}$) with a predetermined reference voltage difference $V_{TH}$ (note that $V_{TH}>0$). If the inequality for state determination "$V_{MAX}-V_{MIN}<V_{TH}$" holds true, controller 1 judges that all the battery units are in the uniform voltage state. In contrast, if the inequality for state determination does not hold true, controller 1 judges that the battery units are in the non-uniform voltage state. The inequality sign "<" in the inequality for state determination may be replaced with "=<." The uniform voltage state mentioned above refers to a state where battery units BT[1] to BT[3] have relatively small variation in output voltage, while the non-uniform voltage state refers to a state where battery units BT[1] to BT[3] have relatively large variation in output voltage. The non-uniform voltage state may occur as a result of battery-unit replacement or for other reasons. The non-uniform voltage state corresponds to a state where there is a certain possibility of large enough current flow to cause depreciation or damage of battery units BT[i] and BT[j] between battery units BT[i] and BT[1] if the positive output terminals of battery units BT[i] and BT[j] are short-circuited (both i and j are integers, and i not=j). In contrast, the uniform voltage state corresponds to a state where there is no or little possibility of such a large current flowing between battery units BT[i] and BT[j].

Figure 4:
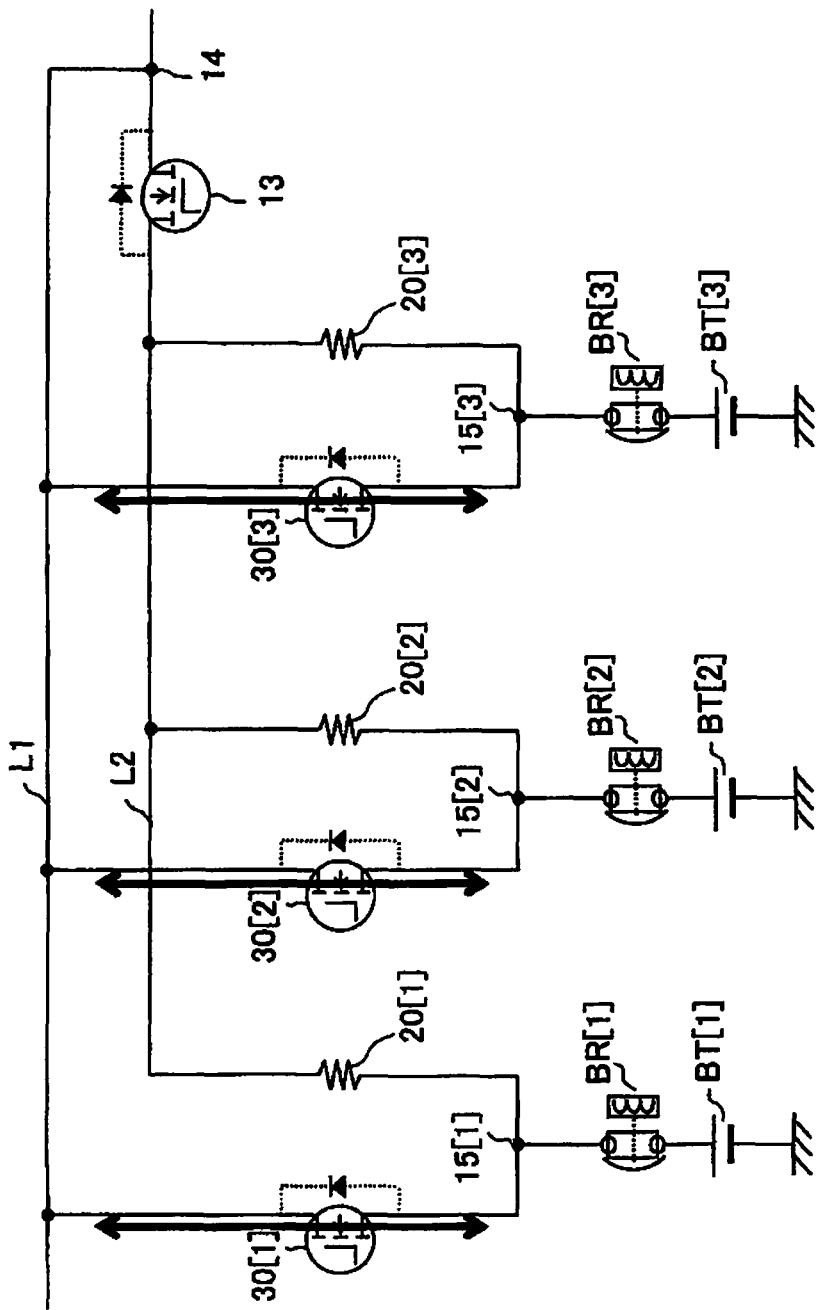
FIG. 4 is a diagram related to a first example and illustrating flow of the current in a parallelly-connected circuit including battery units in a uniform voltage state.

If controller 1 judges that the battery units are in the uniform voltage state, controller 1 turns On all of FETs 30[1] to 30[3]. If charger FETs 6 and 7 are turned on under these conditions, the charging current flows from solar cell 9 or the like through charger FET 6, main line L1 and FETs 30[1] to 30[3] and then flows uniformly or almost uniformly into battery units BT[1] to BT[3], as FIG. 4 shows. Thus, battery units BT[1] to BT[3] are charged. Alternatively, under the conditions that all of FETs 30[1] to 30[3] are in the ON state, discharger FET 8 is turned on to make the uniform or almost uniform discharging current from battery units BT[1] to BT[3] flow through FETs 30[1] to 30[3], main line L1, and discharger FET 8 as FIG. 4 shows, and then be supplied to load 12.

Note that all of FETs 30[1] to 30[3] are in the ON state in the uniform voltage state. Hence, even if sub-line FET 13 is in the ON state, no or ignorable charging current and the discharging current passes through resistive elements 20[i], but both of the charging current and the discharging current pass through FETs 30[1] to 30[3]. Accordingly, if controller 1 judges that all the battery units are in the uniform voltage state, controller 1 may either turn on sub-line FET 13 or turn off sub-line FET 13.

Figure 5:
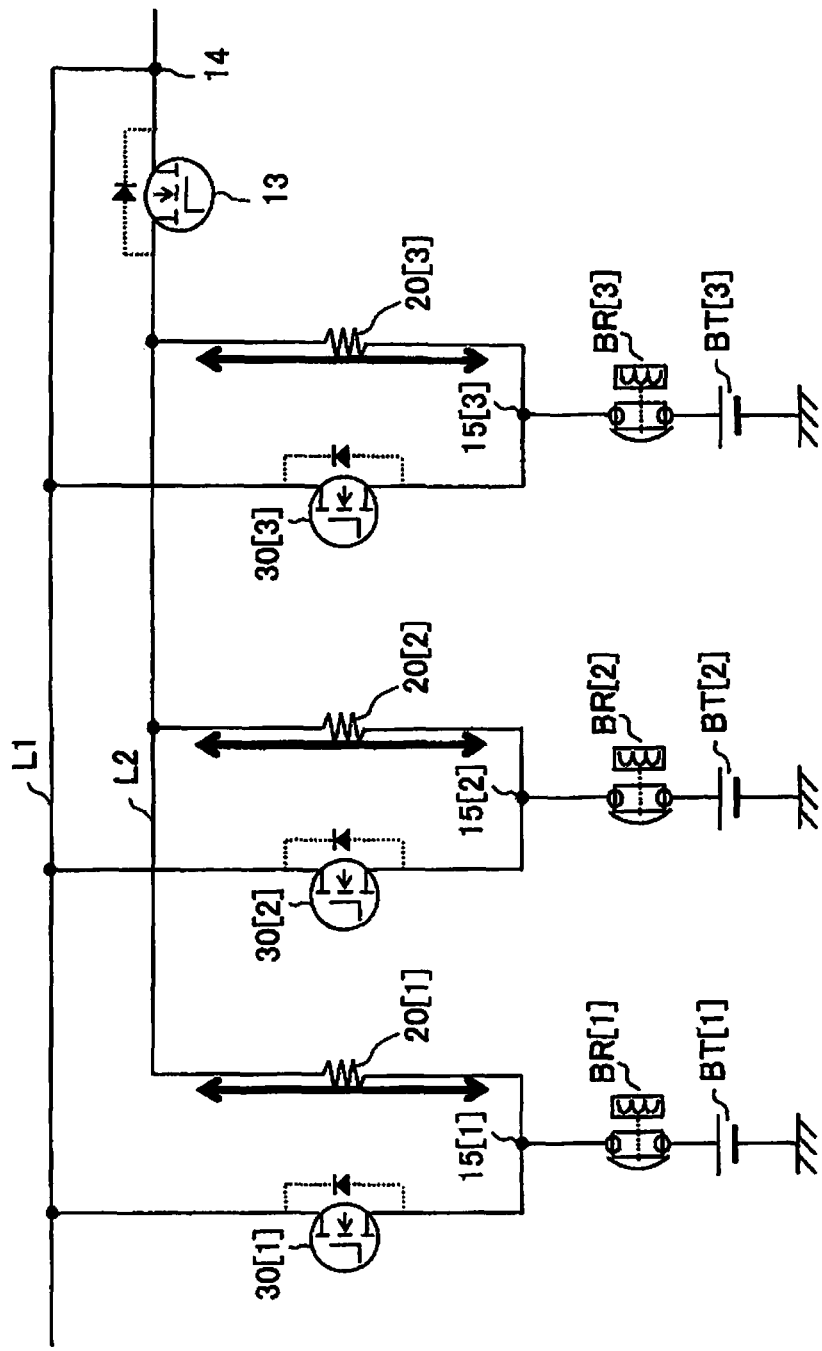
FIG. 5 is a diagram related to the first example and illustrating flow of the current in a parallelly-connected circuit including battery units in a non-uniform voltage state.

If controller 1 judges that battery units are in the non-uniform voltage state, controller 1 turns off all of FETs 30[1] to 30[3] and turns on sub-line FET 13. If charger FETs 6 and 7 are turned on under these conditions, the charging current from solar cell 9 or the like flows through charger FET 6, sub-line FET 13, sub-line L2, and resistive elements 20[1] to 20[3], and then flows into battery units BT[1] to BT[3] as FIG. 5 shows. Thus, battery units BT[1] to BT[3] are charged. The magnitude of charging current passing through each one of resistive elements 20[1] to 20[3] depends on the magnitude of output voltages V[1] to V[3], and thus varies from one battery unit to another (the charging current of a battery unit can be zero). For instance, suppose a case where (V[1], V[2], V[3])=(55 V, 53 V, 54 V). Of all the charging currents passing through resistive elements 20[1] to 20[3] respectively, the charging current for battery unit BT[2] is the largest and the charging current for battery unit BT[1] is the smallest. Accordingly, the battery unit with lower output voltage is charged preferentially, and thus the non-uniformity of output voltage is corrected. In other words, the voltages of the battery units become almost uniform.

If controller 1 judges that battery units are in the non-uniform voltage state and it is necessary to supply current to load 12, controller 1 turns off all of FETs 30[1] to 30[3], while turning on sub-line FET 13, and under these conditions, controller 1 turns on discharger FET 8. Thus, the battery unit with higher output voltage is discharged preferentially though the parasitic diode of FET 30[i]. Consequently, the non-uniformity of output voltage is corrected.

Figure 6:
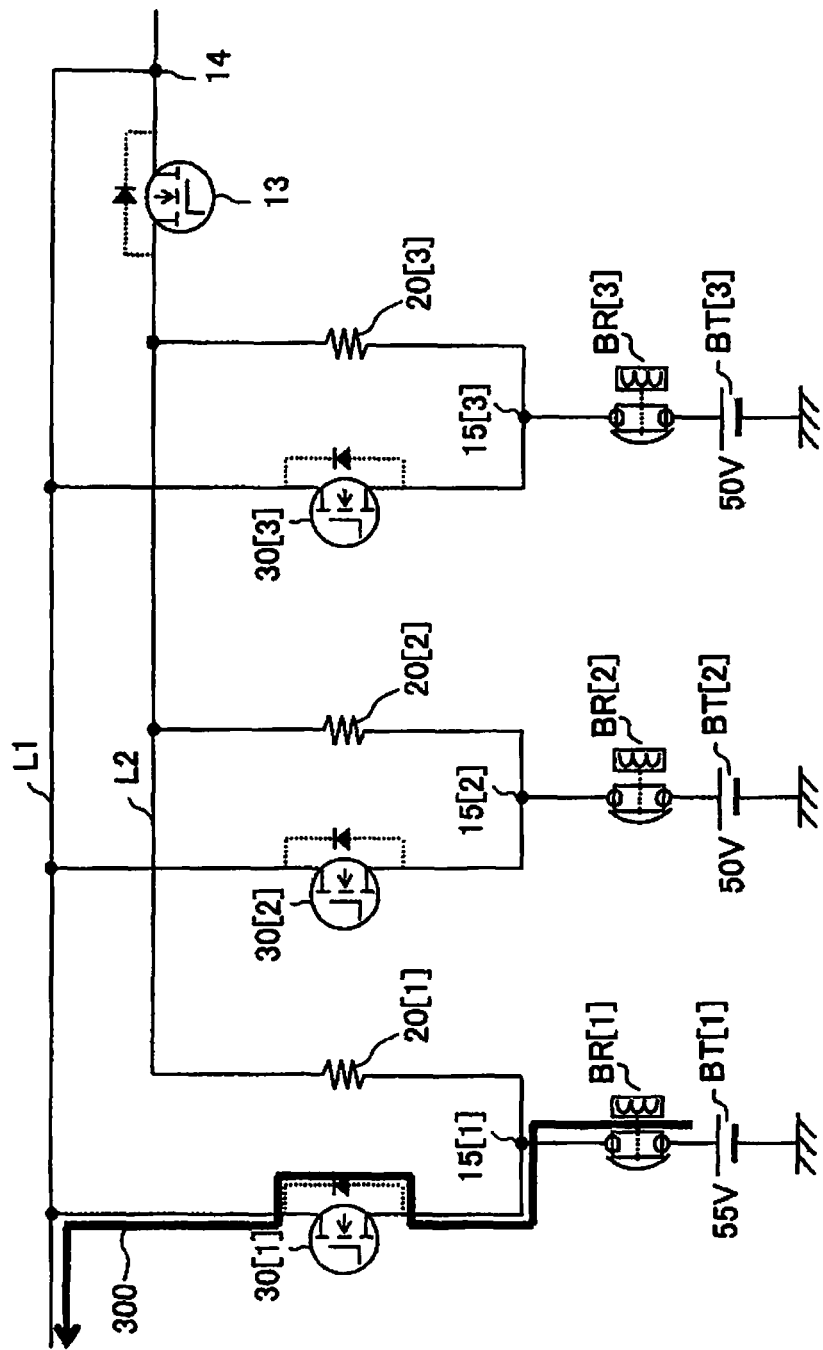
FIG. 6 is a diagram related to the first example and illustrating flow of the discharging current of a case of battery units in a non-uniform voltage state.

For instance, suppose a case (V[1], V[2], V[3])=(55 V, 50 V, 50 V). If controller 1 judges that the battery units are in the non-uniform voltage state and turns on discharger FET 8, current path 300 is formed. Current path 300 starts from battery unit BT[1] towards load 12, and passes through the parasitic diode of FET 30[i], main line L1, and discharger FET 8 as FIG. 6 shows. The discharging current from battery unit BT[1] is supplied to load 12 through current path 300. By the discharging through current path 300, the non-uniformity of output voltage is corrected.

Figure 7:
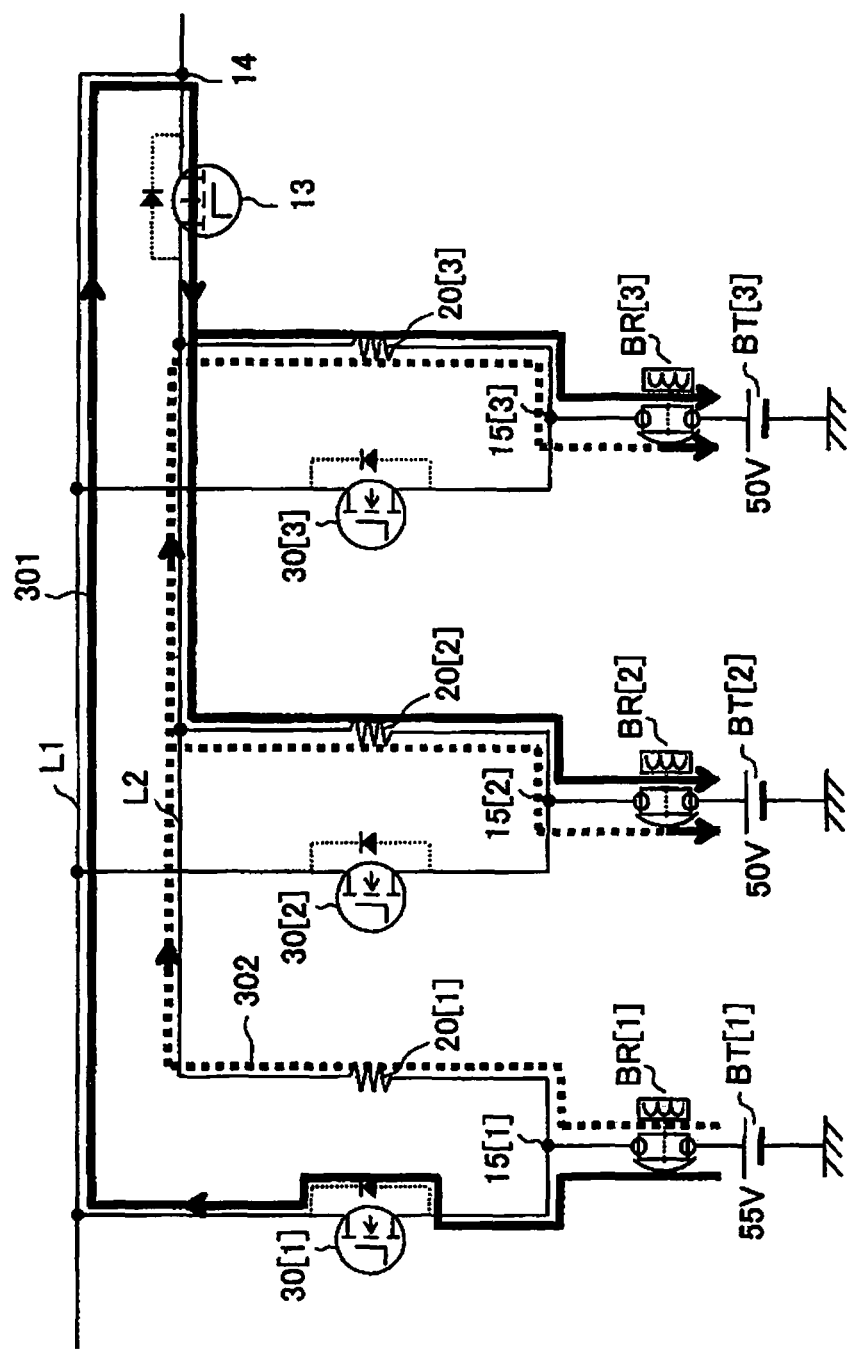
FIG. 7 is a diagram related to the first example and illustrating flow of the discharging current of a case of battery units in a non-uniform voltage state.

In addition, if, for instance, (V[1], V[2], V[3]32 55 V, 50 V, 50 V), part of discharging current for battery unit BT[1] flows into battery units BT[2] and BT[3] as charging current. FIG. 7 shows the paths of the current from battery unit BT[1] to battery units BT[2] and BT[3]. These paths include: current path 301, along which the current passes through the parasitic diode of FET 30[1], main line L1, sub-line FET 13, and sub-line L2, and then either resistive element 20[2] or resistive element 20[3]; and current path 302, along which the current passes through resistive elements 20[1], and then either resistive element 20[2] or resistive element 20[3]. The flow of current between battery units through these current paths also corrects the non-uniformity of output voltage. The current flowing among battery units always passes through resistive element 20[i], so that the depreciation or the like caused by the flowing in or out of excessive current can be avoided.

The principal discharging routes are the discharging route through the parasitic diode of FET 30[i] and the discharging route through resistive element 20[i] such as ones illustrated as current paths 300 and 302 (see FIGS. 6 and 7). Nevertheless, discharging can occur through sub-line FET 13. The discharging through sub-line FET 13 is also carried out preferentially from the battery unit with higher output voltage. Specifically, suppose a case where while all of FETs 30[1] to 30[3] are in the OFF state and sub-line FET 13 is in the ON state. In this case, if discharger FET 8 is turned on, part of the discharging current from battery units BT[1] to BT[3]-which part of the discharging current is determined depending on output voltages V[1] to V[3]-can be supplied to load 12 through resistive elements 20[1] to 20[3] and sub-line FET 13. The magnitude of this discharging current through resistive elements 20[1] to 20[3] depends on the magnitude of output voltages V[1] to V[3], and varies from one battery unit to another (there may be a battery unit of which the discharging current is zero). For instance, suppose a case where (V[1], V[2], V[3]=55 V, 53 V, 54 V). Of all the discharging currents passing through resistive elements 20[1] to 20[3] respectively, the discharging current from battery unit BT[1] is the largest and the charging current from battery unit BT[2] is the smallest. Accordingly, the battery unit with higher output voltage is discharged preferentially, and the discharging also contributes to the correction of the non-uniformity of output voltage.

Note that the connection of the source of FET 30[i] and the connection of the drain of FET 30[i] may be reversed, though the circuit configuration formed in this way is different from the one shown in FIG. 1. Specifically, the source of FET 30[i] is electrically coupled to the side of main line L1, and the drain of FET 30[i] is electrically coupled to the side of branch point 15[i]. In this case, no such current path 300 as one shown in FIG. 6 is formed, but instead of current path 300, another current path for charging from main line L1 through the parasitic diode of FET 30[i] towards battery unit BT[i] is formed when FET 30[i] is in the OFF state. With the circuit configuration shown in FIG. 1, the non-uniformity of output voltage is corrected mainly though discharging. In contrast, with the circuit configuration (hereinafter, referred to as a modified circuit configuration) where the connections of the source and of the drain of FET 30[i] are reversed from those of the circuit configuration shown in FIG. 1, the non-uniformity of output voltage is corrected mainly through charging.

As has been described earlier, if the battery units are in the uniform voltage state, FETs 30[1] to 30[3] are turned on, so that the charging or the discharging of battery units BT[1] to BT[3] can be done with low loss. In contrast, if battery units are in the non-uniform voltage state, the battery unit with lower output voltage is preferentially charged and the battery unit with higher output voltage is preferentially discharged, so that the non-uniformity of output voltage is corrected as has been described earlier. In addition, electrical connections among battery units are secured through sub-line L2 and resistive element 20[1], so that electric current flows from the battery unit with higher output voltage to the battery unit with lower output voltage. Such flow of electric current also corrects the non-uniformity of output voltage. Note that the current flowing among battery units always passes through resistive element 20[i], so that the depreciation or the like of battery units caused by the flowing in or out of excessive current can be avoided.

Example 2

A second example is described. In this second example, as well as in a third and a fifth examples to be described later, description is given of other FET controlling methods based on output voltage V[i] detected by voltage-detection sensor S[i]. In this second example, as well as in the third and the fifth examples to be described later, the operations in the case where it is judged that the battery units are in the uniform voltage state may be the same as those in the first example.

Now, the output voltages of battery units BT[1] and BT[2] are assumed to be equal to each other. Slight differences between the output voltages are ignored in the judgment of equal voltages. To put it differently, the state where the output voltages of battery units BT[1] and BT[2] are assumed to be equal to each other means a state where "|V[1]−V[2]|=<delta V" holds true. In the inequality, delta V signifies the threshold voltage, which is either the reference voltage difference $V_{TH}$ described earlier, or a predetermined positive voltage that is smaller than the reference voltage difference $V_{TH}$.

Suppose a case where the output voltages of battery units BT[1] and BT[2] are equal to each other and the output voltage of battery unit BT[3] is significantly smaller than the equal output voltages of battery units BT[1] and BT[2], so that the battery units are judged to be in the non-uniform voltage state. Such a case is referred to as situation alpha 1. Specifically, a situation where (V[1], V[2], V[3]=50 V, 50 V, 49V) is assumed to be situation alpha 1 in the following description.

Figure 8:
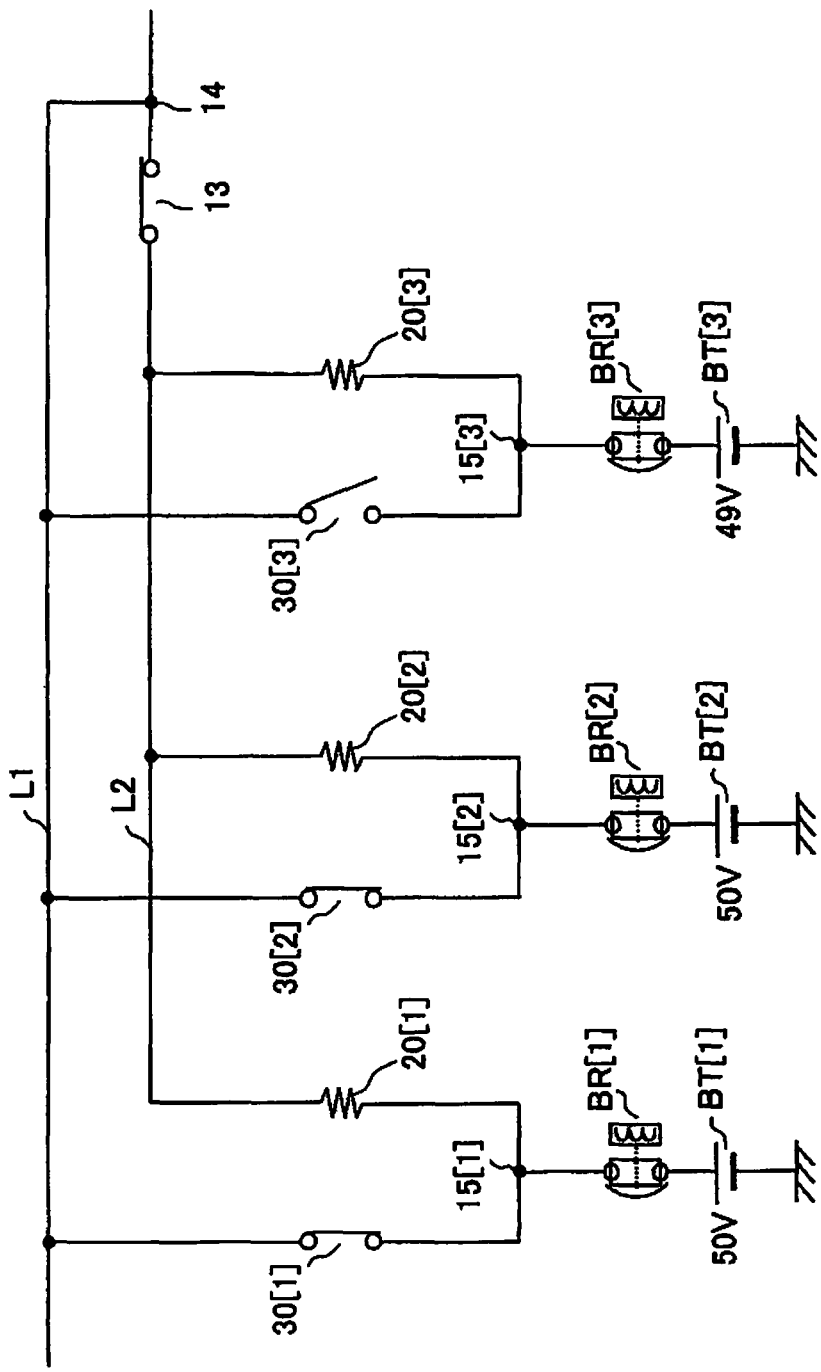
FIG. 8 is a diagram related to a second example and illustrating a case where the parallel-connected circuit includes switching elements each of which is either in the ON state or in the OFF state.

In situation alpha 1, controller 1 selects, from battery units BT[1] to BT[3], the battery unit or units with higher output voltages. Controller 1 then turns on FET 30[i] corresponding to each selected battery unit, and turns off FET 30[1] corresponding to each unselected battery unit. In situation alpha 1, battery units BT[1] and BT[2] have higher output voltages, so that FETs 30[1] and 30[2] corresponding respectively to battery units BT[1] and BT[2] are turned on while FET 30[3] corresponding to battery unit BT[3] is turned off. Here, sub-line FET 13 may be turned on or may be turned off. In the following description sub-line FET 13 is assumed to be turned on. Consequently, the states of continuity of FETs 30[1] to 30[3] and FET 13 are as shown in FIG. 8.

If, under these conditions, discharger FET 8 is turned on, battery units BT[1] and BT[2] are preferentially discharged, and the discharging current from battery units BT[1] and BT[2] is supplied to load 12 through FET 30[1] and 30[2] respectively. Here, if the on resistance of FETs is assumed to be zero as described earlier, the potential of main line L1 becomes 50 V. Hence, part of discharging current from battery units BT[1] and BT[2] flows into battery unit BT[3] through sub-line FET 13 and resistive element 20[3]. Accordingly, as time passes, the non-uniformity of output voltage is corrected. Once a state is achieved where the battery units are judged to be in the uniform voltage state, all of FETs 30[1] to 30[3] are turned on as described in the first example.

In situation alpha 1, also in a case where charger FETs 6 and 7 are turned on, the potential of main line L1, which depends on the output voltages of battery units BT[1] and BT[2], becomes 50 V. Hence, the charging current from solar cell 9 or the like flows preferentially into battery unit BT[3] through sub-line FET 13 and resistive element 20[3]. Accordingly, as time passes, the non-uniformity of output voltage is corrected. Once a state is achieved where the battery units are judged to be in the uniform voltage state, all of FETs 30[1] to 30[3] are turned on as described in the first example.

Even if sub-line FET 13 is in the OFF state, electric current flows from both battery units BT[1] and BT[2] to battery unit BT[3] through resistive elements 20[1] to 20[3]. Such flow of electric current also corrects the non-uniformity of output current. Also in this condition, once a state is achieved where the battery units are judged to be in the uniform voltage state, all of FETs 30[1] to 30[3] are turned on as described in the first example.

As has been described thus far, controller 1 receives information on the output voltages of battery units BT[1] to BT[3] detected by voltage-detection sensors S[1] to S[3] respectively. If the differences among the output voltages are relatively small, controller 1 turns on all the switching elements. In contrast, if the differences are relatively large, controller 1 turns off either all of or some of the switching elements.

The second example can have similar advantageous effects to those obtainable by the first example.

Example 3

A third example is described. The following description of the third example assumes a case where the output voltages of battery units BT[1] to BT[3] are not equal to one another, so that the battery units are judged to be in the non-uniform voltage state. Such a case is referred to as situation alpha 2. A situation where (V[1], V[2], V[3]=51 V, 50 V, 49V) is assumed to be situation alpha 2 in the following description.

Figure 9:
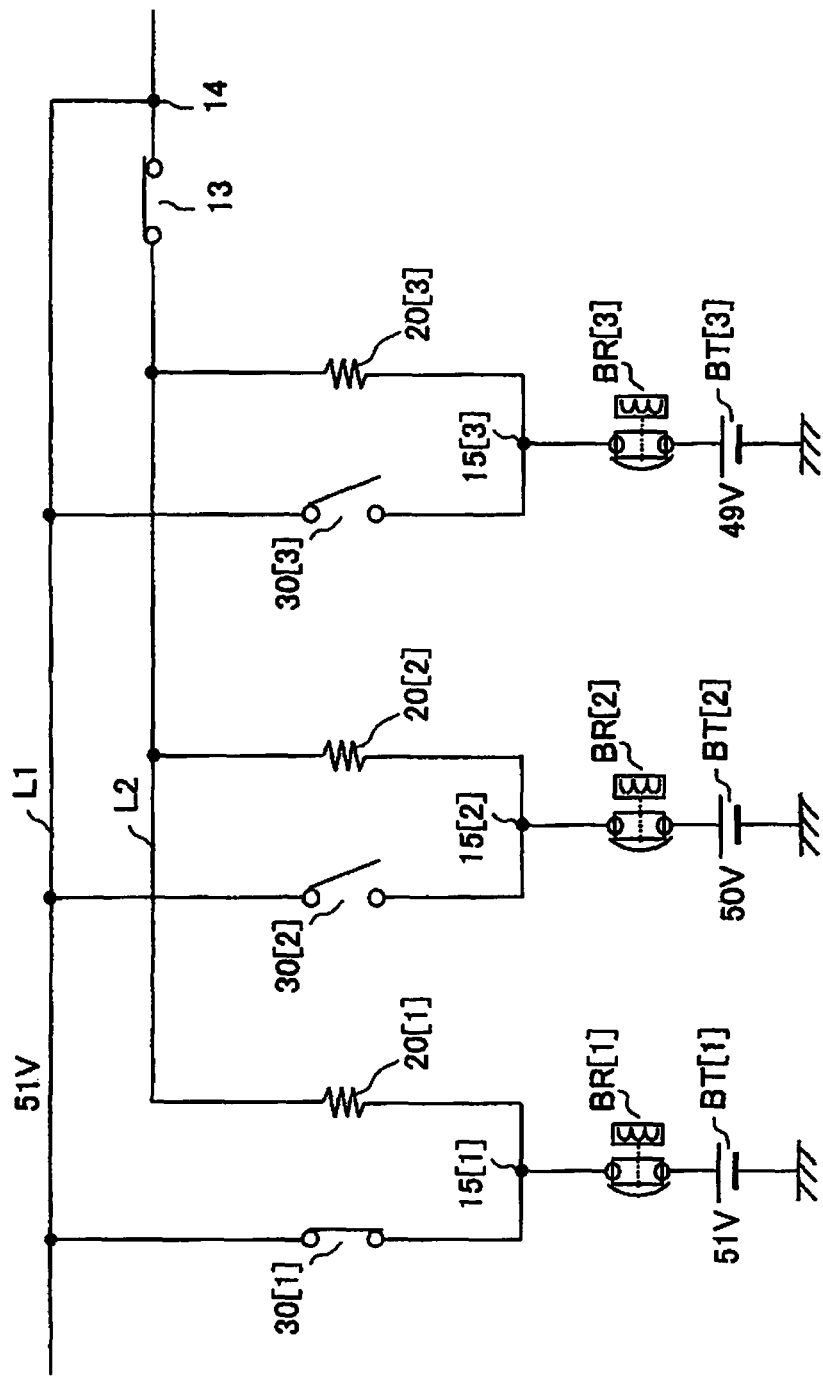
FIG. 9 is a diagram related to a third example and illustrating a case where the parallel-connected circuit includes switching elements each of which is either in the ON state or in the OFF state.

In this case, controller 1 identifies the battery unit with an output voltage that is the maximum voltage V. Then, controller 1 turns on FET 30[i] corresponding to the identified battery unit, and turns off FET 30[i] corresponding to each of the other battery units. Specifically, as FIG. 9 shows, controller 1 turns on FET 30[1], and turns off both of FETs 30[2] and 30[3]. In addition, sub-line FET 13 is turned on. Note that sub-line FET 13 may be turned off as in the case described in the second example.

If, under these conditions, discharger FET 8 is turned on, battery unit BT[1] is preferentially discharged, and the discharging current from battery unit BT[1] is supplied to load 12 through FET 30[1]. Here, if the on resistance of FETs is assumed to be zero as described earlier, the potential of main line L1 becomes 51 V. Hence, part of discharging current from battery unit BT[1] flows into battery units BT[2] and BT[3] through sub-line FET 13 and resistive elements 20[2] and 20[3]. Accordingly, as time passes, the non-uniformity of output voltage is corrected. Once a state is achieved where the output voltages of battery units BT[1] and BT[2] are equal to each other, FET 30[2] is turned on in addition to the already-turned-on FET 30[1] as in the case of situation alpha 1 described in the second example. Then, as time passes, the non-uniformity of output voltage is further corrected and once a state is achieved where the battery units are judged to be in the uniform voltage state, all of FETs 30[1] to 30[3] are turned on as described in the first example.

In situation alpha 2, also in a case where charger FETs 6 and 7 are turned on, the potential of main line L1, which depends on the output voltage of battery unit BT[1], becomes 51 V. Hence, the charging current from solar cell 9 or the like flows preferentially into battery units BT[2] and BT[3] through sub-line FET 13 and resistive elements 20[2] and 20[3]. Accordingly, as time passes, the non-uniformity of output voltage is corrected. Once a state is achieved where the output voltages of battery units BT[1] and BT[2] are equal to each other, FET 30[2] is turned on in addition to the already-turned-on FET 30[1] as in the case of situation alpha 1 described in the second example. Then, as time passes, the non-uniformity of output voltage is further corrected and once a state is achieved where the battery units are judged to be in the uniform voltage state, all of FETs 30[1] to 30[3] are turned on as described in the first example.

Even if sub-line FET 13 is in the OFF state, electric current flows from battery unit BT[1] to battery units BT[2] and BT[3] through resistive elements 20[1] to 20[3]. Such flow of electric current also correct the non-uniformity of output current. Also in this condition, once a state is achieved where the battery units are judged to be in the uniform voltage state, all of FETs 30[1] to 30[3] are turned on as described in the first example.

The third example can have similar advantageous effects to those obtainable by the first example.

Example 4

A fourth example is described. In the configuration described thus far, each of switching element 30[1] to 30[3] and switching element 13 is formed with a single FET. The switching element formed with a single FET is, however, incapable of performing perfectly the bidirectional switching due to the existence of the parasitic diode. To perform perfectly the bidirectional switching, each of switching elements 30[1] to 30[3] and switching element 13 is formed with FETs electrically coupled in series to each other. In this fourth example, two FETs are electrically coupled in series to each other.

For instance, as FIG. 10A shows, switching element 30[i] may be formed with a series-connected circuit of FETs $30_A[i]$ and $30_B[i]$. The source of FET $30_A[i]$ is electrically coupled to branch point 15[i]. The drains of FETs $30_A[i]$ and $30_B[i]$ are electrically coupled to each other. The source of FET $30_B[i]$ is electrically coupled to main line L1. When switching element 30[i] is turned on, both of FETs $30_A[i]$ and $30_B[i]$ are turned on. Switching elements 30[1] to 30[3] may have the same configuration. The connection of the source of FET $30_A[i]$ and that of the drain of FET $30_A[i]$ may be reversed, and at the same time the connection of the source of FET $30_B[i]$ and that of the drain of FET $30_B[i]$ may be reversed.

Likewise, for instance, switching element 13 may be formed with a series-connected circuit of FETs $13_A$ and $13_B$ as FIG. 10B shows. The drain of FET $13_A$ is electrically coupled to sub-line L2. The sources of FETs $13_A$ and $13_B$ are electrically coupled to each other. The drain of FET $13_B$ is electrically coupled to connection point 14. When switching element 13 is turned on, both of FETs $13_A$ and $13_B$ are turned on. The connection of the source of FET $13_A$ and that of the drain of FET $13_A$ may be reversed, and at the same time the connection of the source of FET $13_B$ and that of the drain of FET $13_B$ may be reversed.

The use of the series-connected circuits of FETs shown in FIGS. 10A and 10B as switching element 30[i] and switching element 13 respectively allows the side of parallel-connected circuit 5 to perform bidirectional switching, so that charger FET 6 and discharger FET 8 may be omitted. When such omission occurs, the portions electrically coupled respectively to the source of each omitted FET and to the drain thereof are short-circuited.

With the circuit configuration shown in FIG. 1, it is discharging that mainly corrects the non-uniformity of output voltage. In contrast, with the modified circuit configuration described earlier in the first example, it is charging that mainly corrects the non-uniformity of output voltage. Hence, if which of the discharging and the charging is to be mainly used is difficult to determine for a system, it is difficult to determine which of the circuit configuration shown in FIG. 1 or the modified circuit configuration is more preferably employed in the system. Such a system can adopt preferably the configurations shown in FIGS. 10A and 10B. It is because the non-uniformity of output voltage can be corrected satisfactorily irrespective of which of the discharging and the charging the emphasis is to be put on.

With the configurations shown in FIGS. 10A and 10B, the on/off controlling method of each FET (including FET 30[i]) described in the first example may be used at the time of the occurrence of non-uniform voltage state. In this case, when a non-uniform voltage state occurs, both the charging and the discharging are done through resistive elements 20[i]. Thus, excessive current is prevented from flowing through the battery units. Alternatively, with the configurations shown in FIGS. 10A and 10B used, the on/off controlling method of each FET (including FET 30[i]) described in the second or the third example may be used. The charging and discharging operations of this case are basically the same as those described in the second or the third example. Nevertheless, if, for instance, the discharging current from battery unit BT[i] becomes excessively large (or is likely to be excessively large) the above-described combination allows both of FETs $30_A[i]$ and $30_B[i]$ to be turned off to block the discharging of battery unit BT[i] through FET 30[i] (such blocking naturally contributes to the improvement in safety).

Example 5

A fifth example is described. The use of the methods described in the second and the third examples causes the discharging be done preferentially from battery unit BT[i] with higher output voltage, so that the discharging current is concentrated into a small number of battery units and the small number of battery units may lapse into the overcurrent state. A method of preventing such an overcurrent state from occurring is described in the fifth example.

For the sake of descriptive conveniences, the fifth example assumes, in some cases, that five battery units BT[1] to BT[5] are provided in controlled unit 2. In these cases, the battery units BT[1] to BT[5] are connected in the same way as battery units BT[1] to BT[3] described earlier. Specifically, though not illustrated, the positive output terminal of battery unit BT[4] is electrically coupled to branch point 15[4] via breaker BR[4]. Branch point 15[4] is electrically coupled to main line L1 via FET 30[4] and is electrically coupled to sub-line L2 via resistive element 20[4]. Likewise, though not illustrated, the positive output terminal of battery unit BT[5] is electrically coupled to branch point 15[5] via breaker BR[5]. Branch point 15[5] is electrically coupled to main line L1 via FET 30[5] and is electrically coupled to sub-line L2 via resistive element 20[5]. Specific operations of some cases of the fifth embodiment are described below.

A first case is described. In the first case, three battery units are provided in controlled unit 2, the battery units are in the non-uniform voltage state, and the output voltages of battery units BT[2] and BT[3] are equal to each other. To put it differently, V[2] and V[3] are almost the same, and V[1] is significantly different from both V[2] and V[3]. Specifically, for instance, (V[1], V[2], V[3]=50 V, 49 V, 49 V). On the basis of the output voltage V[i] of each of the plural battery units provided in controlled unit 2, controller 1 groups the plural battery units into plural sets. In the grouping, those battery units whose output voltages are equal to one another are grouped into the same set while those battery units whose output voltages are different from one another are grouped into different sets. In the first case, battery unit BT[1] is in the first set while battery units BT[2] and BT[3] are in the second sets. Of the first and the second sets, controller 1 identifies the one that has more battery units as the selected group and identifies the one other than the selected group as the non-selected group. Then, controller 1 turns on FET 30[i] corresponding to each battery unit that belongs to the selected group, and turns off FET 30[i] corresponding to each battery unit that belongs to the non-selected group. In the first case, the second set is the selected group while the first set is the non-selected group. Hence, FETs 30[2] and 30[3] are turned on while FET 30[1] is turned off. Note that also in this first case, the non-uniform voltage state of the battery units is corrected by the flow of electric current among the battery units through resistive elements 20[1] as time passes. Once a state is achieved where the battery units are judged to be in the uniform voltage state, all of FETs 30[1] to 30[3] are turned on as described in the first example.

A second case is described. In the second case, five battery units are provided in controlled unit 2, the battery units are in the non-uniform voltage state, and the output voltages of battery units BT[1] and BT[2] are equal to each other and the output voltages of battery units BT[3] to BT[5] are equal to each other. To put it differently, V[1] and V[2] are almost the same and V[3] to V[5] are almost the same, and V[1] and V[2] are significantly different from V[3] to V[5]. Specifically, for instance, (V[1], V[2], V[3], V[4], V[5]=50 V, 50 V, 49 V, 49 V, 49 V).

In the cases where more than three battery units are provided in controlled unit 2 (including the second case and other cases to be described later), controller 1 performs a similar method of controlling FET 30[i] to the one described in the first case. Specifically, on the basis of the output voltage V[i] of each of the plural battery units provided in controlled unit 2, controller 1 groups the plural battery units into plural sets. In the grouping, those battery units whose output voltages are equal to one another are grouped into the same set while those battery units whose output voltages are different from one another are grouped into different sets. Of the plural sets, controller 1 identifies the one that has the most battery units as the selected group and identifies the ones other than the selected group as the non-selected groups. Then, controller 1 turns on FET 30[i] corresponding to each battery unit that belongs to the selected group, and turns off FET 30[i] corresponding to each battery unit that belongs to the non-selected groups.

In the second case, battery units BT[1] and BT[2] are grouped into a first group and battery units BT[3] to BT[5] are grouped into a second group. Then, the second set is identified as the selected group while the first set is identified as the non-selected group. Hence, FETs 30[3] to 30[5] are turned on while FETs 30[1] and 30[2] are turned off. Note that also in this second case, the non-uniform voltage state of the battery units is corrected by the flow of electric current among the battery units through resistive elements 20[i] as time passes. Once a state is achieved where the battery units are judged to be in the uniform voltage state, all of FETs 30[1] to 30[5] are turned on as described in the first example (the same applies to the third and the fourth cases).

A third case is described. In the third case, five battery units are provided in controlled unit 2, the battery units are in the non-uniform voltage state. The output voltages of battery units BT[4] and BT[5] are equal to each other while the output voltages of battery units BT[1] to BT[4] are different from one another. For instance, (V[1], V[2], V[3], V[4], V[5]=52 V, 51 V, 50 V, 49 V, 49 V). Then, battery units BT[1], BT[2], and BT[3] are grouped into a first, a second, and a third sets respectively. Both of battery units BT[4] and BT[5] are grouped into a fourth set. The fourth set is identified as the selected group while the first to the third sets are identified as the non-selected group. Hence, FETs 30[4] and 30[5] are turned on while FETs 30[1] to 30[3] are turned off.

A fourth case is described. In the fourth case, five battery units are provided in controlled unit 2, the battery units are in the non-uniform voltage state. The output voltages of battery units BT[1] to BT[5] are different from one another. For instance, (V[1], V[2], V[3], V[4], V[5]=52 V, 51 V, 50 V, 49 V, 48 V). In this case of the battery units with different output voltages from one another, controller 1 turns off all of FETs 30[1] to 30[5], and corrects the non-uniform voltage state only by the flow of electric current among battery units via resistive elements 20[i]. Through the correction, the output voltages of two or more battery units become equal to each other. Once such equal output voltages are achieved, appropriate ones of FETs 30[i] are turned on in accordance with the above-described method.

According to this fifth example, FETs corresponding to the battery units in the most numerous set are turned on, so that the occurrence of an overcurrent state becomes less likely.

Note that the technique that has been described in this fifth example is useful in preventing the concentration of current from causing an overcurrent state. If no overcurrent state occurs even with the concentration of current in a single battery unit, controller 1 may perform an FET control that allows such concentration to occur.

Example 6

A sixth example is described. Controller 1 in this sixth example needs no detection value of output voltage of each battery unit BT[i]. Controller 1 in this sixth example controls the states of continuity of FETs 30[1] to 30[3] on the basis of the period of time elapsed after the battery-unit replacement.

This method is described in more detail. The battery unit BT[i] that is removed from apparatus AP shown in FIG. 3 during the battery-unit replacement is referred to as the old battery unit while the battery unit that is attached to apparatus AP as the new battery unit BT[i] is referred to as the new battery unit.

Now, suppose a state where a sufficiently long time has passed since the last battery-unit replacement in which any chosen battery unit or units BT[i] are replaced. Such a state is referred to as the reference state. In the reference state, the output voltages of all the battery units BT[1] to [3] are equal to one another. Hence, in the reference state, controller 1 turns on all of FETs 30[1] to 30[3].

Suppose that battery unit BT[i] is removed from apparatus AP as an old battery unit and a new battery unit is attached to apparatus AP as new battery unit BT[i]. Note that two or more battery units may be replaced. Controller 1 is capable of detecting the occurrence of the replacement of battery unit BT[i], that is, the replacement of the old battery unit with a new battery unit and the attachment of the new battery unit in apparatus AP. Any method can be used for the detection.

For instance, voltage measuring units VM[i] to measure the voltages at branch points 15[i] are provided in parallel-connected circuit 5. In the example, voltage measuring units VM[1] to VM[3] measure the voltages of branch points 15[1] to 15[3] respectively. Each measured value is output as branch-point voltage information. The branch-point voltage information mentioned above includes not only the voltage at the branch point but also broader information to be used in specifying the voltage at the branch point. Controller 1 receives the branch-point voltage information. Controller 1 may receive the branch-point voltage information directly from voltage measuring units VM[1] to VM[3]. Alternatively, a third apparatus may be provided to receive branch-point voltage information from voltage measuring units VM[1] to VM[3]. The third apparatus processes the data when necessary, and then sends the data to controller 1. On the basis of the branch-point voltage information thus received, controller 1 detects the attachment of a new battery unit in apparatus AP. There are various other methods of detecting the replacement of battery unit BT[i] from the old battery unit to the new battery unit. For instance, the casing (not illustrated) to hold battery units BT[i] may be provided with mechanical switches SW[1] to SW[3] or the like to detect the existence or the non-existence of battery units BT[i].

Upon detecting the attachment of a new battery unit in apparatus AP, controller 1 starts measuring, by use of timer 41, the length of time TP that has passed since the new battery unit is attached to apparatus AP. When elapsed time TP does not exceed predetermined length of time $TP_{TH}$, controller 1 judges that the battery units are in the non-uniform voltage state (note that $TP_{TH}>0$). If elapsed time TP exceeds the predetermined length of time $TP_{TH}$, controller 1 judges that the battery units are in the uniform voltage state. If another battery-unit replacement occurs while elapsed time TP is being measured, measured elapsed time TP is reset to zero, and the measurement of elapsed time TP is resumed from the point of time at which the other new battery unit is attached to apparatus AP. Note that in the sixth example, timer 41 is provided outside of controller 1 to show clearly timer 41, but timer 41 may be provided in controller 1.

Operations performed in the cases where controller 1 judges that the battery units are in the non-uniform voltage state and judges that the battery units are in the uniform voltage state are similar to the ones described in first example. Accordingly, similar advantageous effects to the ones that are obtainable by the first example can be obtained. Even without the reference to the detected values of the output voltages of the battery units, the flow of electrical currents among battery units through resistive elements 20[i] correct gradually the non-uniformity of output voltages as elapsed time TP increases. Accordingly, the use of elapsed time TP makes it possible to distinguish, most accurately, the uniform voltage state from the non-uniform voltage state.

Example 7

A seventh example is described. As has been described earlier in the fourth example, if charger FET 6 and discharger FET 8 are omitted from the circuit configuration, switching element 13 is essential. If, however, charger FET 6 and discharger FET 8 are included in the circuit configuration, switching element 13 is not essential. This is because if the battery units are in the uniform voltage state, switching elements 30[1] to 30[3] are turned on and no electric current passes through switching element 13 irrespective of whether switching element 13 is in the ON state or in the OFF state. In contrast, if the battery units are in the non-uniform voltage state, electric current flows among battery units through resistive elements 20[i] irrespective of whether the continuity of switching element 13 is on or off.

Accordingly, if both charger FET 6 and discharger FET 8 exist, switching element 13 may be always in the ON state or in the OFF state, or switching element 13 itself may be omitted from the circuit configuration. If switching element 13 itself is omitted from the circuit configuration, the connection point of sub-line L2 and each resistive element 20[i] is either isolated from or directly coupled to the connection point of main line L1 and the corresponding switching element 30[i].

Providing switching element 13, however, has some advantageous effects. Specifically, mainline L1 and sub-line L2 can be electrically coupled when required to form a current path or paths (e.g., current path 301 shown in FIG. 7) that are useful in correcting the non-uniformity of output voltages. The electrical continuation between main line L1 and sub-line L2 can be cut when necessary. For instance, suppose a case where main line L1 and sub-line L2 are directly connected to each other and battery unit BT[i] is judged to be in the overcharged state. In this case, even if switching element 30[i] is in the OFF state, the electric current from solar cell 9 can flow into battery unit BT[i] through resistive element 20[1]. By switching element 13, the flow of such electric current can be blocked.

For instance, suppose a case where FETs 6 and 8 are not provided and the difference between the voltage of main line L1 and each battery unit BT[i] is significantly large. In this case, if FET 30[i] is turned on, excessively large current flows through battery unit BT[i]. Switching element 13 can be used to protect the battery units against such inrush current. Specifically, under the conditions that the turning on of FET 30[i] is expected to cause excessively large inrush current to flow through battery unit BT[i], switching element 13 is turned on first while FET 30[i] is left in the OFF state. Thus electric current of a certain magnitude that has passed through resistive element 20[i] is made to flow through battery unit BT[i]. The flow of such current reduces the above-mentioned difference between the voltage of main line L1 and battery unit BT[i], and then FET 30[i] can be turned on. Such protection against inrush current is impossible if switching element 13 is omitted from the circuit configuration and the connection point between sub-line L2 and each resistive element 20[i] is isolated from the connection point between main line L1 and the corresponding switching element 30[i].

Now, suppose a case where FETs 6 and 8 are not provided, switching element 13 is omitted from the circuit configuration, and the contact point between sub-line L2 and each resistive element 20[i] is directly connected to the connection point between main line L1 and the corresponding switching element 30[i]. In this case, even if battery unit BT[i] is overcharged or overdischarged, further charging or discharging of battery unit BT[i] cannot be stopped. The existence of switching element 13 is also useful in preventing such an inconvenience from occurring.

In addition, with switching element 13 that has a configuration shown in FIG. 10B, further charging of battery unit BT[i] can be prevented in case of overcharging battery unit BT[i] while, at the same time, only the discharging of battery unit BT[i] through switching element 13 can be allowed. Likewise, further discharging of battery unit BT[i] can be prevented in case of overdischarging battery unit BT[i] while, at the same time, only the charging of battery unit BT[i] through switching element 13 can be allowed.

Example 8

An eighth example is described. Resistive elements with positive temperature characteristics (i.e., resistive elements with a positive temperature coefficient) may be used as resistive elements 20[1] to 20[3] (see FIG. 1), which are resistive elements for voltage-non-uniformity correction. In particular, for instance, PTC (positive temperature coefficient) thermistors can be used for this purpose. PTC thermistors are thermistors with positive temperature characteristics (i.e., thermistors with a positive temperature coefficient). As is well known, the resistance of each thermistor changes with changes in temperature to a greater degree than the resistance of each ordinary resistive element (carbon-film resistors etc) used for obtaining a constant resistance. The resistance of each PTC thermistor increases as the temperature of the PTC thermistor rises.

Figure 13:
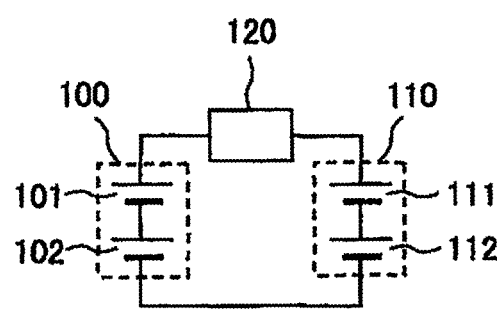
FIG. 13 is a circuit diagram related to an eighth example and used in a simulation.

The effects that the use of resistive elements 20[i] with positive temperature characteristics has is studied through the following simulations. FIG. 13 is a diagram illustrating the circuit used in the simulations. The simulations include first and second simulations described later.

Battery unit 100 shown in FIG. 13 includes a series-connected circuit of batteries 101 and 102 whereas battery unit 110 includes a series-connected circuit of batteries 111 and 112. The output voltage of the series-connected circuit of batteries 101 and 102 appears at the positive output terminal of battery unit 100 with the negative output terminal of battery unit 100 being the reference. The output voltage of the series-connected circuit of batteries 111 and 112 appears at the positive output terminal of battery unit 110 with the negative output terminal of battery unit 110 being the reference. The positive output terminals of battery units 100 and 110 are electrically coupled to each other via resistive element 120 whereas the negative output terminals of battery units 100 and 110 are electrically coupled directly to each other.

Each of batteries 101, 102, 111, and 112 is a secondary battery with a nominal output voltage of 48 V, a maximum output voltage of 52 V, and a minimum output voltage of 39 V. Accordingly, the maximum difference between the output voltages of battery units 100 and 110 is 26 V.

In the simulations, first to fourth sample elements are individually used as resistive element 120. The first sample element is a PTC thermistor with a resistance of 6 ohm at a certain reference temperature, so that the first sample is referred to as a 6-ohm thermistor. The 6-ohm thermistor has the same temperature as the reference temperature unless the 6-ohm thermistor generates heat due to power loss. The second sample element, which always has a resistance of 6 ohm irrespective of the temperature thereof, is referred to as a 6-ohm simple resistor. The third sample element is a resistive element, which always has a resistance of 12.3 ohm irrespective of the temperature thereof, is referred to as a 12.3-ohm simple resistor. The fourth sample element is a resistive element, which always has a resistance of 240 ohm irrespective of the temperature thereof, is referred to as a 240-ohm simple resistor.

The simulations use the characteristics of 6-ohm thermistor shown in FIG. 14. Specifically, for instance, when the voltage $E_{TM}$ applied to the 6-ohm thermistor is 26 V, the 6-ohm thermistor has a temperature $T_{TM}$ of 135.5 degrees C. and a resistance $R_{TM}$ of 236.4 ohm. At the same time, the current $I_{TH}$ flowing through the 6-ohm thermistor is approximately 0.11 A (amperes) because $I_{TM}=E_{TM}/R_{TM}=26/$ 236.4=about 0.11. Consequently, the heating value $Q_{TM}$ of the 6-ohm thermistor, which is the power loss of the 6-ohm thermistor, is 2.86 W (watts) because $Q_{TM}=I_{TM} \times I_{TM} \times R_{TM}=0.11 \times 0.11 \times 236.4=$ about 2.86. Of the above-mentioned characteristics, the current $I_{TM}$ and the temperature $T_{TM}$ are measured values. The resistance $R_{TM}$ and the heating value $Q_{TM}$ are values calculated by assigning the measured values to the formulas.

As FIG. 14 clearly shows, in the 6-ohm thermistor, the changes in the applied voltage cause less change in the heat generated amount for the following reasons. An increase in the voltage applied to a PTC thermistor such as the 6-ohm thermistor increases the current, and the larger current in turn increases the amount of generated heat. The larger amount of generated heat in turn raises the temperature, and the higher temperature increases the resistance. The increase in the resistance reduces the current, and eventually reduces amount of generated heat. Conversely, a decrease in the applied voltage reduces the current, and the smaller current in turn reduces the amount of generated heat. The smaller amount of generated heat lowers the temperature, and the lower temperature in turn reduces the resistance. The smaller resistance increases the current and eventually increases the amount of generated heat.

Figure 15A:
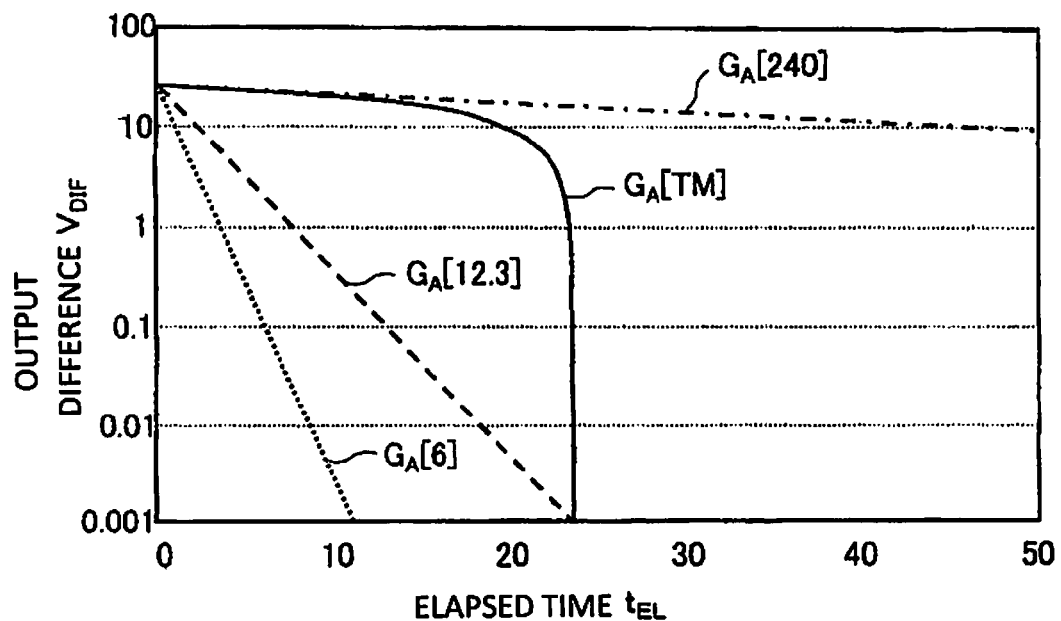
FIG. 15 shows graphs related to the eighth example and describing the result of a first simulation.
Figure 15B:
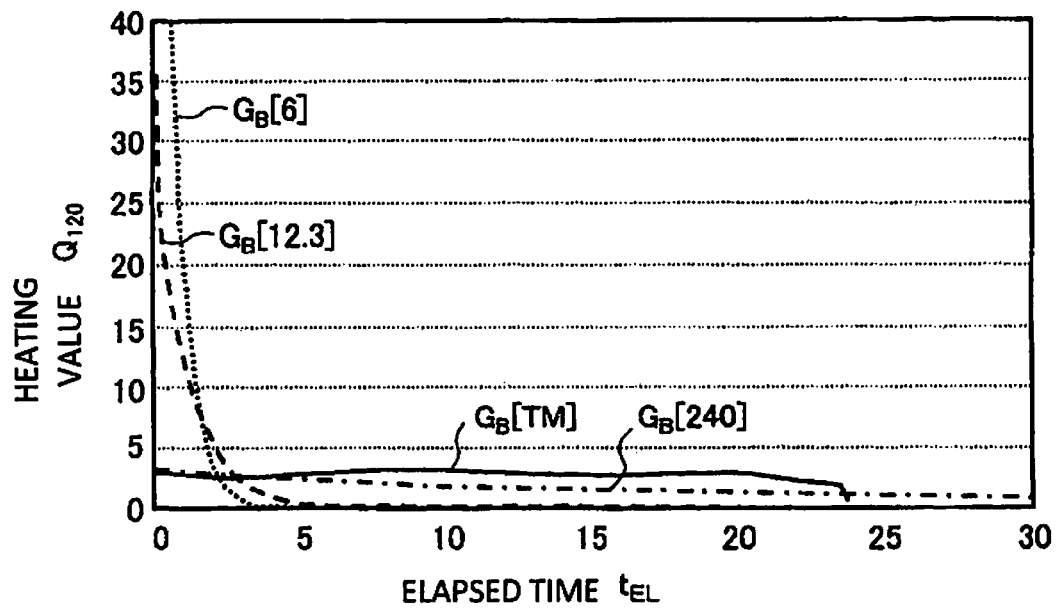

FIGS. 15A and 15B show the results of a first simulation. The first simulation assumes that the difference $V_{DIF}$ between the output voltages of battery units 100 and 110 is 26 V at the reference point of time. On this assumption, arithmetic operations are performed to calculate, for each of the sample elements, the relationship between the time $t_{EL}$ elapsed from the reference point of time and the output-voltage difference $V_{DIF}$. In addition, arithmetic operations are performed to calculate, for each of the sample elements, the relationship between the elapsed time $t_{EL}$ and the heating value $Q_{120}$ generated by the sample element.

In FIG. 15A, dotted line $G_A[6]$, dashed line $G_A[12.3]$, dashed-dotted line $G_A[240]$, and solid line $G_A[TM]$ respectively represent the relationships between the elapsed time $t_{EL}$ and the output-voltage difference $V_{DIF}$ for the cases where the 6-ohm simple resistor, the 12.3-ohm simple resistor, the 240-ohm simple resistor, and the 6-ohm thermistor are used as resistive element 120. In FIG. 15B, dotted line $G_B[6]$, dashed line $G_B[12.3]$, dashed-dotted line $G_B[240]$, solid line $G_B[TM]$ respectively represent the relationships between the elapsed time $t_{EL}$ and heating value $Q_{120}$ for the cases where the 6-ohm simple resistor, the 12.3-ohm simple resistor, the 240-ohm simple resistor, and the 6-ohm thermistor are used as resistive element 120. It is assumed that while the output-voltage difference $V_{DIF}$ ranges from 26 V to 0 V, a linear relationship exists between the reserve capacity and the output voltage of each of batteries 101, 102, 111, and 112 (i.e., the reserve capacity and the output voltage are proportional to each other). Accordingly, each of batteries 101, 102, 111, and 112 is assumed to be not fully charged or nearly fully charged, and is assumed to be not fully discharged or nearly fully discharged. The unit for the elapsed time $t_{EL}$ is an integral multiple of second.

As FIG. 15A shows, the elapsed time $t_{EL}$ till the output voltage difference $V_{DIF}$ reaches 0.001 V is approximately 11 units time for the case where 6-ohm simple resistor is used as resistive element 120. The corresponding elapsed time $t_{EL}$ for the 12.3-ohm simple resistor is approximately 24 units time, and that for the 6-ohm thermistor is also approximately 24 units time. The length of one unit time depends on the capacity of battery 101 or the like. Hereinafter, the elapsed time $t_{EL}$ till the output voltage difference $V_{DIF}$ reaches 0.001 V is referred to as the voltage-balancing time. Though not shown in FIG. 15A, the voltage-balancing time for the case where 240-ohm simple resistor is used as resistive element 120 is approximately 464 unit time.

As FIG. 15B shows, the maximum value of the heating value $Q_{120}$ is approximately 36 W (watts) for the case where 12.3-ohm simple resistor is used as resistive element 120. The corresponding value for the 240-ohm simple resistor is approximately 3 W, and that for 6-ohm thermistor is also approximately 3 W. Though not shown in FIG. 15B, the maximum value of the heating value $Q_{120}$ for the case where 6-ohm simple resistor is used as resistive element 120 is approximately 113 W. This is because if 6-ohm simple resistor is used as resistive element 120 and $t_{EL}=$about 0, $Q_{120}=(26 V \times 26 V)/6$ ohm=about 113 W holds true.

Notice that the second, the third, and the fourth sample elements are selected with the following criteria. A 6-ohm simple resistor is selected as the second sample element because the 6-ohm simple resistor is a simple resistor with a resistance that is equal to the resistance of the 6-ohm thermistor at the reference temperature. A 240-ohm simple resistor is selected as the fourth sample element because the 240-ohm simple resistor is a simple resistor with a resistance that is approximately equal to the maximum resistance of the 6-ohm thermistor (approximately 240 ohm; see FIG. 14). A 12.3-ohm simple resistor is selected as the third sample element because the 12.3-ohm simple resistor is a simple resistor with a voltage-balancing time that is approximately equal to the voltage-balancing time of the 6-ohm thermistor in the first simulation.

The results of the first simulation show that in comparison to the case where the 6-ohm thermistor is used as resistive element 120, the use of the 6-ohm simple resistor as resistive element 120 cuts the voltage-balancing time approximately in half, but increases the maximum amount of generated heat by approximately 40 (=about 113/3) times. In addition, in comparison to the case where the 6-ohm thermistor is used as resistive element 120, the use of the 240-ohm simple resistor as resistive element 120 leaves the maximum amount of generated heat approximately the same (approximately 3 W), but increases the voltage-balancing time by approximately 20 (=about 464/24) times. In addition, in comparison to the case where the 6-ohm thermistor is used as resistive element 120, the use of the 12.3-ohm simple resistor as resistive element 120 leaves the voltage-balancing time approximately the same, but increases the maximum amount of generated heat by approximately 10 times.

Figure 16A:
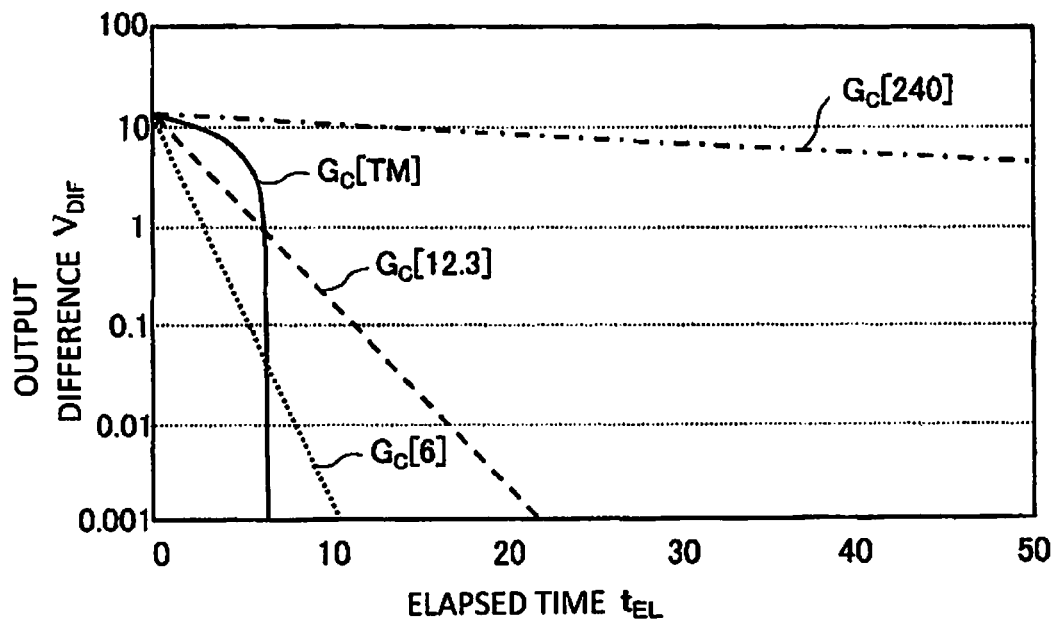
FIG. 16 shows graphs related to the eighth example and describing the result of a second simulation.
Figure 16B:
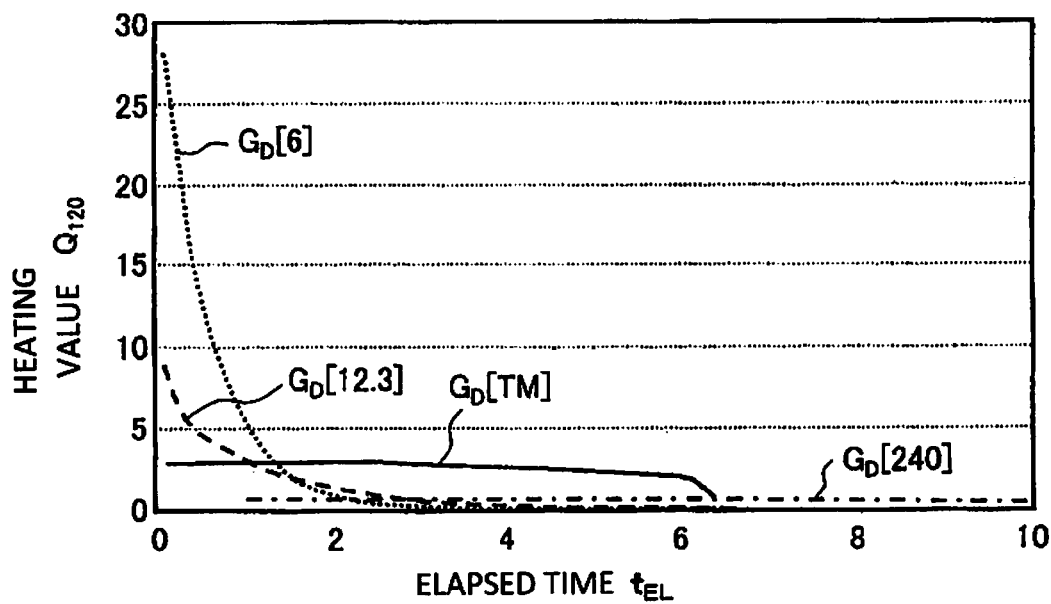

FIGS. 16A and 16B show the results of a second simulation. The second simulation assumes that the difference $V_{DIF}$ between the output voltages of battery units 100 and 110 is 13 V at the reference point of time. On this assumption, arithmetic operations are performed to calculate, for each of the sample elements, the relationship between the time $t_{EL}$ elapsed from the reference point of time and the output-voltage difference $V_{DIF}$. In addition, arithmetic operations are performed to calculate, for each of the sample element, the relationship between the elapsed time $t_{EL}$ and the heating value $Q_{120}$ generated by the sample element.

In FIG. 16A, dotted line $G_C[6]$, dashed line $G_C[12.3]$, dashed-dotted line $G_C[240]$, and solid line $G_C[TM]$ respectively represent the relationships between the elapsed time $t_{EL}$ and the output-voltage difference $V_{DIF}$ for the cases where the 6-ohm simple resistor, the 12.3-ohm simple resistor, the 240-ohm simple resistor, and the 6-ohm thermistor are used as resistive element 120.

In FIG. 16B, dotted line $G_D[6]$, dashed line $G_D[12.3]$, dashed-dotted line $G_D[240]$, solid line $G_D[TM]$ respectively represent the relationships between the elapsed time $t_{EL}$ and heating value $Q_{120}$ for the cases where the 6-ohm simple resistor, the 12.3-ohm simple resistor, the 240-ohm simple resistor, and the 6-ohm thermistor are used as resistive element 120. As in the case of the first simulation, it is assumed that while the output-voltage difference $V_{DIF}$ ranges from 13 V to 0 V, a linear relationship exists between the reserve capacity and the output voltage of each of batteries 101, 102, 111, and 112 (i.e., the reserve capacity and the output voltage are proportional to each other).

As FIG. 16A shows, the voltage-balancing time is approximately 10 units time for the case where 6-ohm simple resistor is used as resistive element 120. The corresponding voltage-balancing time for the 12.3-ohm simple resistor is approximately 22 units time, and that for the 6-ohm thermistor is approximately 6 units time. Though not shown in FIG. 16A, the voltage-balancing time for the case where 240-ohm simple resistor is used as resistive element 120 is approximately 432 unit time.

As FIG. 16B shows, the maximum value of the heating value $Q_{120}$ is approximately 28 W (watts) for the case where 6-ohm simple resistor is used as resistive element 120. The corresponding value for the 12.3-ohm simple resistor is approximately 9 W, and that for 6-ohm thermistor is also approximately 3 W. The maximum value of the heating value $Q_{120}$ for the case where 240-ohm simple resistor is used as resistive element 120 is not larger than 1 W.

The following observations can be obtained from the first and the second simulations. The use of a simple resistor (e.g., 6-ohm simple resistor) as resistive element 120 cuts the maximum heating value of resistive element 120 in the second simulation into a quarter of its counterpart in the first simulation, but leaves the voltage-balancing time in the second simulation approximately the same as its counterpart in the first simulation. To put it differently, the use of a simple resistor as resistive element 120 increases the maximum heating value of resistive element 120 with the square of the output voltage difference $V_{DIF}$, but hardly changes the time needed for the voltage-non-uniformity correction (i.e., the voltage-balancing time) almost the same even if the degree of the non-uniformity is decreased (e.g., even if the degree of the non-uniformity is decreased from 26 V down to 13 V). As a matter of course, the increase in the maximum amount of generated heat increases the maximum rating of, the physical size of, and the cost for resistive element 120.

In contrast, the use of 6-ohm thermistor as resistive element 120 leaves little difference between the maximum amounts of heat generated by resistive element 120 in the first and the second simulations, but cuts the voltage-balancing time in the second simulation into a quarter of its counterpart in the first simulation. To put it differently, if a PTC thermistor such as the 6-ohm thermistor is used as resistive element 120, the maximum heating value of resistive element 120 can be kept down to a predetermined value or even smaller basically irrespective of the increase or the decrease in the output voltage difference $V_{DIF}$. Moreover, the time needed for the voltage-non-uniformity correction (i.e., the voltage-balancing time) is reduced by an amount corresponding to the reduction in the degree of non-uniformity. Furthermore, under a restrictive condition that the maximum amount of generated heat must not be larger than a limit amount (e.g., 5 W), the use of a PTC thermistor as resistive element 120 can shorten the voltage-balancing time from the case where a simple resistor is used as resistive element 120 (see, for instance, $G_A[240]$ and $G_A[TM]$ in FIG. 15A and $G_B[240]$ and $G_B[TM]$ in FIG. 15B).

These observations testify to the utility of the use of a PTC thermistor as resistive element 20[i] shown in FIG. 1 and the like. The use of a PTC thermistor as resistive element 20[i] can keep the maximum heating value of resistive element 20[i] down to a predetermined value, and, at the same time, can shorten the voltage-balancing time in comparison to the case where a simple resistor is used as resistive element 20[i]. The use of a PTC thermistor as resistive element 20[i] is particularly effective for a system where the occurrence of the output-voltage non-uniformity of the battery units is unpredictable and for a system where only a part of the battery units is replaced in the battery-unit replacement. In addition, the use of a PTC thermistor as resistive element 20[i] is particularly effective when a new battery unit attached to apparatus AP (see FIG. 3) in battery-unit replacement is in the 40% to 60% capacity state. To put it differently, if a battery unit is replaced with a new one in battery-unit replacement, the voltage difference between each of those battery units not changed and the new battery unit attached to apparatus AP in the replacement has to be kept as small as possible. In this respect, it is difficult to specify the capacity states of those battery units not changed. If a new battery unit of 40% to 60% capacity state is attached to apparatus AP, it is possible to limit a maximum value of the voltage difference between each of the battery units not changed and the new battery unit attached to apparatus AP in the replacement. Note that the battery unit of 40% to 60% capacity state means a battery unit whose actual reserve capacity is 40% to 60% of the rated reserve capacity.

Modifications

The embodiment described above can be modified in various ways if necessary within the scope of the technical ideas shown in the claims. The embodiment is only an example of the embodiment. What the various terms of the invention and of the constituent elements of the invention mean are not limited to those described in the embodiment given above. Those specific numerical values that appear in the description given above are only for the illustrative purpose. The numerical values can be changed in various ways. The following items are some of the items applicable to the above-described examples. These items can be combined in any manner as long as they do not cause an inconsistency.

Figure 11:
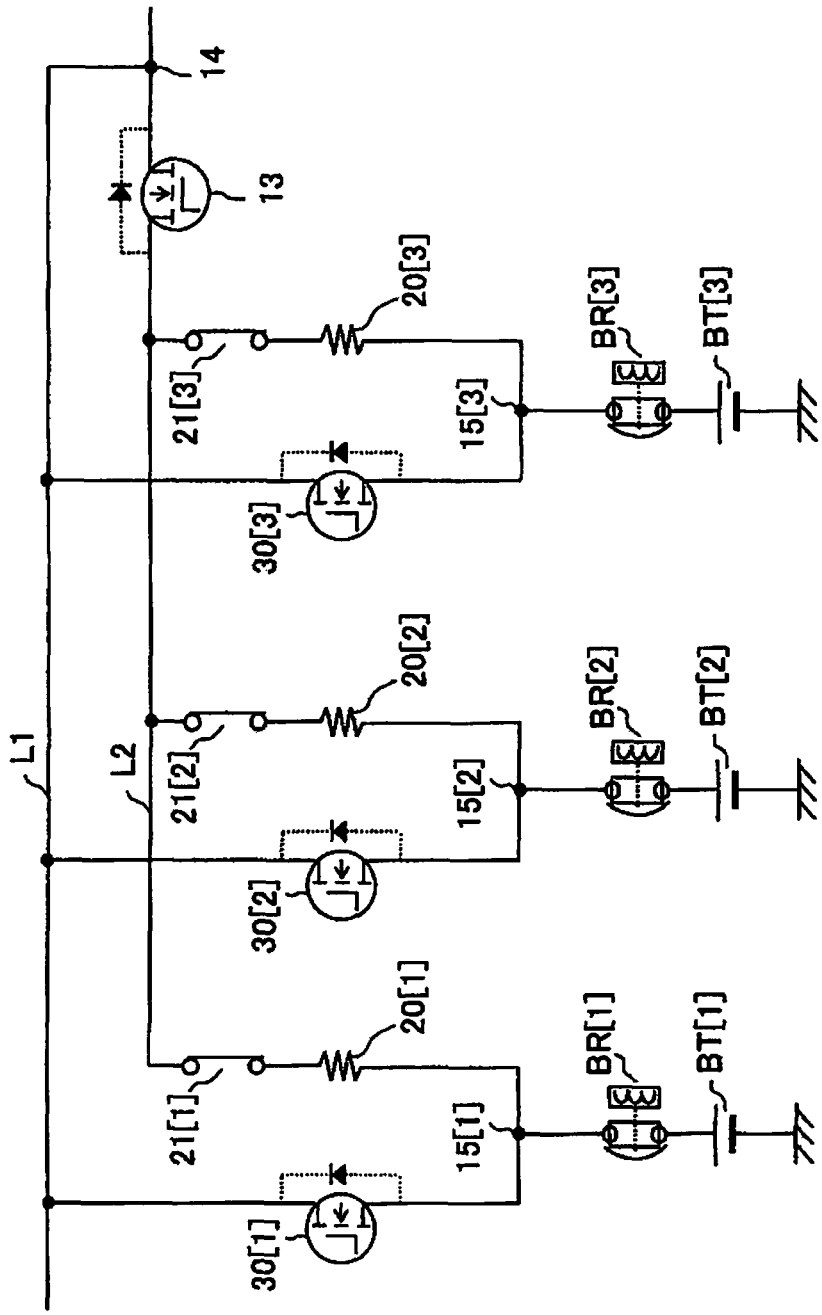
FIG. 11 is a diagram illustrating a modification of the parallel-connected circuit according to the embodiment.
Figure 12:
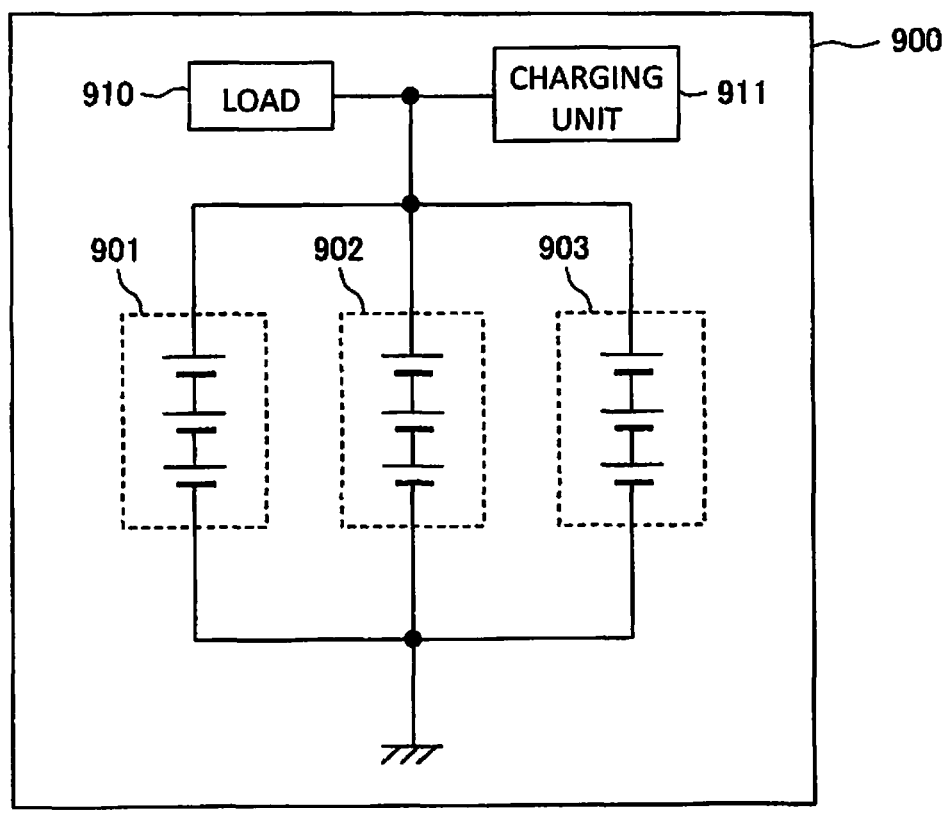
FIG. 12 is a diagram related to a conventional technique and illustrating an apparatus using plural battery units.

As FIG. 11 shows, each of switching elements 21[1] to 21[3] may be interposed, in series, between the corresponding one of resistive elements 20[1] to 20[3] and sub-line L2. The continuity of each of switching elements 21[1] to 21[3] may be controlled by controller 1. Each switching element 21[1] may be formed with FETs. Each switching element 21[i] is normally in the ON state, but if any abnormalities occur in battery unit BT[i] and the charging or the discharging of battery unit BT[i] is stopped completely, switching element 21[i] may be turned off together with switching element 30[i]. Thereby, battery unit BT[i] can be cut off both from main line L1 and from sub-line L2. Note that if switching elements 21[1] to 21[3] are provided, switching element 13 may be omitted.

In the above-described battery system, both the charging of battery units BT[i] by use of solar cell 9 or the like and the discharging of battery units BT[i] to load 12 can be performed. It is allowable that the battery system is made to perform either the charging or the discharging.

The above-described embodiment assumes that each FET is an n-channel-type FET. Each FET, however, may be a p-channel-type FET.

The characteristics of the battery units may become non-uniform also in a case where the battery units in controlled unit 2 are replaced all together with new ones. The invention is also applicable to and useful in the case where the battery units are replaced all together.

The battery parallel-operation circuit may be considered as a circuit including both parallel-connected circuit 5 and controller 1 shown in FIG. 1. It is, however, possible to consider the battery parallel-operation circuit as a circuit including nothing but parallel-connected circuit 5.

As has been described thus far, according to the embodiment, it is possible to provide a battery parallel-operation circuit and a battery system capable of electrically connecting safely plural chargeable or dischargeable battery units in parallel to one another.

The entire contents of Japanese Patent Applications Nos. P2010-177254 entitled "BATTERY PARALLEL-OPERATION CIRCUIT AND BATTERY SYSTEM" filed on Aug. 6, 2010 and P2010-228088 entitled "BATTERY PARALLEL-OPERATION CIRCUIT AND BATTERY SYSTEM" filed on Oct. 8, 2010 are incorporated herein by reference.

Some of the applications of the invention are electrically-driven vehicles (including vehicles of a single wheel, two wheels, three wheels, four wheels, or more wheels), power tools, and electronic devices (including PCs, mobile phones, PDAs, etc.).

What is claimed is:

1. A battery parallel-operation circuit comprising:
   a first line electrically coupled to a branch point and an external load that is electrically connectable to the battery parallel-operation circuit, the first line comprising a switching element; and
   a second line electrically coupled to the external load and the branch point, the second line comprising a resistive element;
   wherein the battery parallel-operation circuit includes a plurality of the first lines and a plurality of the second lines, the plurality of first lines are electrically coupled in parallel to one another, and the plurality of second lines are electrically coupled in parallel to one another,
   wherein a plurality of the branch points are electrically coupled respectively to a plurality of external, connectable battery units,
   wherein each of multiple switching elements is electrically coupled to a corresponding one of the battery units, and is connected in series between the external load and the battery unit, and
   wherein each of multiple resistive elements is electrically coupled to a corresponding one of the battery units, and is connected in series between the external load and the battery unit.

2. The battery parallel-operation circuit of claim 1, further comprising a controller configured to control the continuity of each of the switching elements.

3. The battery parallel-operation circuit of claim 2, wherein each of the plurality of battery units comprises a voltage detecting portion configured to, either periodically or at any desired timing, detect an output voltage of the battery unit and output output-voltage information.

4. The battery parallel-operation circuit of claim 3, wherein the controller receives the output-voltage information,
   if the difference in output voltages is less than a predetermined threshold, the controller turns on all of the switching elements, and
   if the difference in output voltages is not less than the predetermined threshold, the controller turns off either all or some of the switching elements.

5. The battery parallel-operation circuit of claim 3, wherein the controller receives the output-voltage information,
   the controller identifies the battery unit with the largest output voltage among the plurality of battery units, and
   the controller turns on the switching element corresponding to the battery unit with the largest output voltage, and turns off the other switching elements.

6. The battery parallel-operation circuit of claim 3, wherein the plurality of battery units comprise a first to an nth battery unit (n is an integer of 3 or more),
   if the output voltage difference of the plurality of battery units is relatively large, the controller groups the first to the nth battery units into a first to an mth sets (m is an integer of 2 or more) on the basis of the output voltages of the battery units,
   the controller identifies the set with the largest number of battery units among the first to the mth sets, and
   the controller turns on the switching elements corresponding to the battery units in the identified set, and turns off the switching elements corresponding to the battery units in the set other than the identified set.

7. The battery parallel-operation circuit of claim 3, wherein the plurality of battery units comprise a first to an nth battery unit (n is an integer of 3 or more),
   if the output voltage difference of the plurality of battery units is relatively large, the controller groups the first to the nth battery units into two sets on the basis of the output voltages of the battery units,
   the controller identifies which one of the two sets has a larger number of battery units, and
   the controller turns on the switching elements corresponding to the battery units in the identified set, and turns off the switching elements corresponding to the battery units in the other set.

8. The battery parallel-operation circuit of claim 3, wherein the controller receives the output-voltage information,
   if the difference in output voltages is less than or equal to a predetermined threshold, the controller turns on all of the switching elements, and if the difference in output voltages is not less than or equal to the predetermined threshold, the controller turns off either all or some of the switching elements.

9. The battery parallel-operation circuit of claim 1, further comprising:
   a plurality of the battery units configured to supply electric current respectively to the plurality of branch points; and
   a controller configured to control the continuity of each of the switching elements,
   wherein the controller comprises a timer configured to measure a time elapsed after replacement of any of the plurality of battery units, and
   wherein the controller controls the continuity of each of the switching elements on the basis of the elapsed time measured by the timer.

10. The battery parallel-operation circuit of claim 9, wherein
   on the basis of the elapsed time measured by the timer, the controller turns on all of the switching elements till the measured elapsed time reaches a predetermined time, and
   the controller turns off either all or some of the switching elements after the measured elapsed time reaches the predetermined time.

11. The battery parallel-operation circuit of claim 9, wherein, if any of the battery units is replaced before the measured elapsed time reaches the predetermined time, the controller resets the timer and then starts another measurement of the elapsed time.

12. The battery parallel-operation circuit of claim 1, wherein the switching elements are FETs.

13. The battery parallel-operation circuit of claim 12, wherein
the forward direction of a parasitic diode of the discharger FET is directed from the load to the first lines,
the forward direction of a parasitic diode of the charger FET is directed from the power-supply circuit to the first lines, and
the forward direction of a parasitic diode of the FET used as each of the switching elements is directed from the corresponding battery unit to the corresponding first line.

14. The battery parallel-operation circuit of claim 12, wherein
each of the first line comprises a second switching element,
the forward direction of a parasitic diode of the switching element is directed from the corresponding battery unit to the first line, and
the forward direction of a parasitic diode of the second switching element is directed from the first line to the battery unit.

15. The battery parallel-operation circuit of claim 12, further comprising:
a discharger FET connected in series between the load and the first lines;
a power-supply circuit configured to supply charging current to each of the battery units; and
a charger FET connected in series between the power-supply circuit and the first lines.

16. The battery parallel-operation circuit of claim 15, wherein
the plurality of first lines and the plurality of second lines are electrically coupled to each other at a connection point, and
the battery parallel-operation circuit comprises a second-line switching element provided between the connection point and the plurality of second lines and connected in parallel to the charger FET.

17. The battery parallel-operation circuit of claim 1, wherein each of the resistive elements is a thermistor that has a positive temperature characteristic.

18. The battery parallel-operation circuit of claim 1, wherein each of the second lines comprises a switching element.

19. A battery system comprising:
a plurality of battery units;
a battery parallel-operation circuit comprising:
a first line electrically coupled to a branch point and an external load that is electrically connectable to the battery parallel-operation circuit, the first line comprising a switching element; and
a second line electrically coupled to the external load and the branch point, the second line comprising a resistive element;
wherein the battery parallel-operation circuit includes a plurality of the first lines and a plurality of the second lines, the plurality of first lines are connected in parallel to one another, and the plurality of second lines are connected in parallel to one another,
wherein the branch points are electrically coupled respectively to the plurality of battery units,
wherein each of multiple switching elements is electrically coupled to a corresponding one of the battery units, and is connected in series between the external load and the battery unit, and
wherein each of the resistive elements is electrically coupled to a corresponding one of the battery units, and is connected in series between the external load and the battery unit.

20. The battery system of claim 19, wherein each of the battery units is attachable and detachable.

* * * * *